(12) United States Patent
Frimand

(10) Patent No.: US 11,293,217 B2
(45) Date of Patent: Apr. 5, 2022

(54) REINFORCED FLEXIBLE STRUCTURE OR SEAL

(71) Applicant: Raxit Seals ApS, Holte (DK)

(72) Inventor: Claus Frimand, Holte (DK)

(73) Assignee: RAXIT SEALS APS, Holte (DK)

( * ) Notice: Subject to any disclaimer, the term of this patent is extended or adjusted under 35 U.S.C. 154(b) by 0 days.

(21) Appl. No.: 16/956,235

(22) PCT Filed: Dec. 20, 2018

(86) PCT No.: PCT/DK2018/050413
§ 371 (c)(1),
(2) Date: Jun. 19, 2020

(87) PCT Pub. No.: WO2019/120455
PCT Pub. Date: Jun. 27, 2019

(65) Prior Publication Data
US 2021/0095520 A1    Apr. 1, 2021

(30) Foreign Application Priority Data

Dec. 22, 2017 (DK) .............................. PA201700744
Jan. 8, 2018 (DK) .............................. PA201800009
(Continued)

(51) Int. Cl.
*E06B 7/232* (2006.01)
*B60J 10/18* (2016.01)
(Continued)

(52) U.S. Cl.
CPC .............. *E06B 7/232* (2013.01); *B60J 10/18* (2016.02); *E06B 7/16* (2013.01); *E06B 7/2314* (2013.01)

(58) Field of Classification Search
CPC ... B60J 10/18; B60J 10/32; Y10T 428/24198; Y10T 428/2902; E06B 7/232; E06B 7/2314

See application file for complete search history.

(56) References Cited

U.S. PATENT DOCUMENTS 2,204,630 A * 6/1940 Spraragen ................. B60J 10/33
428/122
2,601,512 A * 6/1952 Gagnier .................... B60J 10/80
49/492.1

(Continued)

*Primary Examiner* — Justin B Rephann
(74) *Attorney, Agent, or Firm* — Ziegler IP Law Group, LLC

(57) ABSTRACT

A reinforced flexible seal (101 and 201) for sealing a gap or space, such as a gap or space between an edge of a wall, fence, door, door leaf or wing, port or window and a surface adjacent to the wall, fence, door, door leaf or wing, port or window is provided. The flexible seal may be used to provide a barrier below a door leaf or door wing in order to avoid entrance of for example unwanted animals. The reinforced flexible seal has a width and a length and comprises a flexible outer material (102a, 102b, 202a, 202b), and a plurality of elongated metal wires (103, 203) embedded in the flexible outer material and running substantially in a longitudinal direction of the reinforced flexible seal with at least part of said elongated metal wires arranged at a distance to each other. For at least one of the embedded elongated metal wires, at least part of said metal wire holds several bent, bulging or wavelike deformations in the longitudinal direction of the wire.

31 Claims, 10 Drawing Sheets

(30) Foreign Application Priority Data

| Mar. 12, 2018 | (DK) | PA201870153 |
| Apr. 13, 2018 | (DK) | PA201800160 |
| May 28, 2018 | (DK) | PA201800238 |
| Nov. 27, 2018 | (DK) | PA201800923 |

(51) Int. Cl.
    *E06B 7/23*     (2006.01)
    *E06B 7/16*     (2006.01)

(56) References Cited

U.S. PATENT DOCUMENTS

| 2,716,788 | A | * | 9/1955 | Naramore | E06B 7/2314 49/498.1 |
| 2,892,658 | A | * | 6/1959 | Peras | B60J 10/78 49/144 |
| 3,071,826 | A | * | 1/1963 | Ziffer | B60J 10/30 49/492.1 |
| 3,091,821 | A | * | 6/1963 | Cook, Jr. | B01D 29/111 428/100 |
| 3,124,851 | A | * | 3/1964 | Straight et al. | B60J 10/18 49/490.1 |
| 3,126,440 | A | * | 3/1964 | Goodloe | H05K 9/0015 174/358 |
| 3,150,422 | A | * | 9/1964 | Michaels | E06B 7/232 49/368 |
| 3,167,824 | A | * | 2/1965 | Berwangerjohn | B60J 10/30 49/482.1 |
| 3,198,689 | A | * | 8/1965 | Lansing | B60J 10/18 428/121 |
| 3,374,578 | A | * | 3/1968 | Mesnel | B60J 10/74 49/440 |
| 3,708,871 | A | * | 1/1973 | Mintz | H05K 9/0015 29/592.1 |
| 3,788,008 | A | * | 1/1974 | Yackiw | B60J 10/16 49/496.1 |
| 4,228,209 | A | * | 10/1980 | Chavannes | B29C 51/22 428/108 |
| 4,413,033 | A | * | 11/1983 | Weichman | B60J 10/32 428/122 |
| 4,517,233 | A | * | 5/1985 | Weichman | B60J 10/18 428/108 |
| 4,520,562 | A | * | 6/1985 | Sado | H01R 12/52 29/878 |
| 4,624,093 | A | * | 11/1986 | Gibson | B60J 10/18 428/122 |
| 5,009,947 | A | * | 4/1991 | McManus | B29C 48/154 428/122 |
| 5,072,567 | A | * | 12/1991 | Cook | B60J 10/18 52/717.05 |
| 5,143,666 | A | * | 9/1992 | McManus | B29C 48/12 264/472 |
| 6,189,198 | B1 | * | 2/2001 | Keeney | B29C 53/083 29/527.4 |
| 6,214,267 | B1 | * | 4/2001 | Keys | B60J 10/18 264/171.16 |
| 6,461,713 | B2 | * | 10/2002 | King | B32B 5/12 428/108 |
| 6,761,954 | B2 | * | 7/2004 | Hauser | B29C 48/08 428/108 |
| 6,792,718 | B2 | * | 9/2004 | Nozaki | B60J 10/18 49/441 |
| 6,926,787 | B2 | * | 8/2005 | Hauser | B60J 10/18 156/177 |
| 7,028,510 | B1 | * | 4/2006 | DaRosa | D04B 21/20 66/190 |
| 7,464,461 | B2 | * | 12/2008 | Hight, Jr. | B21D 53/36 24/293 |
| 8,870,258 | B2 | * | 10/2014 | Nishimoto | B60J 10/18 296/93 |
| 2002/0092242 | A1 | * | 7/2002 | Hope | B29C 48/12 49/475.1 |
| 2002/0184826 | A1 | * | 12/2002 | Nozaki | B60J 10/30 49/441 |
| 2003/0213181 | A1 | * | 11/2003 | Weil | E06B 7/16 49/492.1 |
| 2005/0198909 | A1 | * | 9/2005 | Qiang | F24C 15/021 49/492.1 |
| 2009/0000205 | A1 | * | 1/2009 | Bright | B60J 10/74 49/489.1 |

\* cited by examiner

REINFORCED FLEXIBLE STRUCTURE OR SEAL

TECHNICAL FIELD

The disclosure relates to a structure or seal for sealing a space, such as a space between an edge of a wall, fence, a door, door leaf or door wing, port or window and an adjacent surface to avoid entrance of for example unwanted animals, insects, or water between the edge of the wall, fence, door or window and the surface. The unwanted animals or water may include rats, mice, rainwater, sewage water, and water from flooding. The structure or seal may also help in preventing temperature changes across the sealed space.

BACKGROUND

A general problem of entryway design for buildings relates to the dual issues of excluding inclement weather and animals or vermin from entering or impacting the interior when the entryway is shut. One category of known sealing strips for excluding inclement weather comprises flexible synthetic or rubber strips, which are installed at the perimeter of the door at an entryway. Another category of flexible strips for controlling internal temperature are manufactured with rows of tightly packed bristles.

However, vermin are wily and persistent in the face of currently-known flexible barriers, which are keeping them from shelter and/or food. The term vermin relates to animals considered to be pests, including rats and mice. Synthetic or rubber or bristle strips may present a challenge but not a lasting one, and especially rats or mice will find a way in to reach any available food.

Thus, there is a need for an improved seal being both reinforced and flexible and which is able to maintain the reinforcement and flexibility during use.

SUMMARY

It is an object of the invention to provide an improved structure, seal, seal strip, seal assembly or seal combination, which has a strength and flexibility to be used as a barrier for sealing a space between an edge of a wall, fence, door leaf or door wing, port or window and an adjacent surface to avoid entrance of animals, insects, or water, or to avoid temperature changes, and which maintains the strength and flexibility during use.

This object is achieved in accordance with a first aspect by providing a reinforced flexible seal for sealing a gap or space, such as a gap or space between an edge of a wall, fence, door, door leaf or wing, port or window and a surface adjacent to the wall, fence, door, door leaf or wing, port or window, said reinforced flexible seal having a width and a length and comprising:
  a flexible outer material; and
  a plurality of elongated metal wires embedded in the flexible outer material and running substantially in a longitudinal direction of the reinforced flexible seal with at least part of said elongated metal wires arranged at a distance to each other;
  wherein for at least one of the embedded elongated metal wires, at least part of said metal wire holds several bent, bulging or wavelike deformations in the longitudinal direction of the wire.

The bent deformations may be or may include curve-shaped bends and/or wave-shaped bends. It is preferred that the bent, bulging or wavelike deformations are stable deformations.

The metal wires holding said bent, bulging or wavelike deformations, may hold at least 3 of said deformations.

By having the embedded metal wires running substantially in a longitudinal direction of the reinforced flexible seal and at a distance to each other, the seal is reinforced while being flexible around an axis parallel to the longitudinal direction of the reinforced flexible seal or parallel to the longitudinal direction of the elongated metal members or metal wires.

However, for a flexible seal, which has metal wires embedded within a flexible material and running substantially in a longitudinal direction within the flexible material, there is a problem when using such a seal as a barrier below a door leaf or door wing in order to avoid entrance of for example unwanted animals. In order to provide such a barrier, an upper or connection part of the seal may be connected to a lower edge of the door leaf or door wing, while a lower or sealing part of the seal extends below the edge of the door leaf or door wing with reinforcing wires embedded within said lower part and running in the longitudinal direction of the seal. The opening and closing of the door leaf or door wing may bend the lower part of the seal back and forth along an axis substantial parallel to the metal wires, which bending may cause the metal wires to move relative to the flexible outer material. The result may be that for an end part of the seal, part of the metal wires may extend outside the end part of the flexible outer material. A solution to this problem is achieved by providing several bent, bulging or wavelike deformations in the longitudinal direction of the metal wires embedded in the lower part of the seal.

By having the metal wires deformed by several bent, bulging or wavelike deformations while being embedded within the flexible outer material, the metal wires will be locked within the flexible structure, and the elongated metal wires may not be able to move relative to the flexible outer material, if the flexible seal is flexed back and forth relative to a lengthwise direction of the elongated metal wires and the flexible seal. When the metal wires are held in position within the seal, the reinforcement of the seal is maintained during use. When the deformations of the metal wires are stable, the locking of the wires within the flexible structure is maintained.

In a possible implementation form of the first aspect, the gap is the threshold gap under a door, door leaf or door wing.

In a possible implementation form of the first aspect, the reinforced flexible seal comprises a mounting or connection part and a sealing part, and wherein the sealing part comprises several of said metal wires embedded in the flexible outer material and running in the longitudinal direction of the seal and holding said bent, bulging or wavelike deformations.

The mounting or connection part can be used for mounting the seal to an edge of a wall, fence, door, port or window with the sealing part extending below said edge. Thus, the reinforced sealing part can provide a seal for a gap between said edge and an adjacent surface.

The number of metal wires within the sealing section provided with said deformations may be at least one, two, three, or four.

In a possible implementation form of the first aspect, the sealing part comprises a plurality of said elongated metal wires embedded in the flexible outer material and running substantially in a longitudinal direction of the reinforced flexible seal with at least part of said elongated metal wires arranged at a distance to each other, said sealing part having a maximum width defined by the maximum distance between the two outermost positioned of said elongated metal wires;
  wherein the mounting or connection part is arranged next to the sealing part alongside one of said outermost positioned elongated metal wires; and
  wherein the mounting or connection part comprises a flexible material and has a maximum width no less than one fifth, or no less than one quarter of the maximum width of the mounting or connection part.

In a possible implementation form of the first aspect, the mounting or connection part holds no elongated metal wires running substantially parallel to the elongated metal wires of the sealing part.

In a possible implementation form of the first aspect, the mounting or connection part and the sealing part comprise the same flexible material.

A bulging or wavelike deformation may have a top part and a bottom or lower part with a height difference between the highest point of the top part and the lowest point of the bottom or lower part.

A minimum deformation of an embedded metal wire is needed in order to maintain the position of the metal wire within the flexible structure.

Thus, in a possible implementation form of the first aspect, each metal wire holding bent, bulging or wavelike deformations has a diameter or thickness, and the bent, bulging or wavelike deformations has a top part and a bottom or lower part with a height difference between the highest point of the top part and the lowest point of the bottom or lower part. Here, the difference in height between the top part and a consecutive bottom part of a bent, bulging or wavelike deformation may be at least % of the diameter or thickness of the metal wire, such as at least ¾ of said diameter or thickness, such as at least the measure of said diameter or thickness, or such as at least 1% of said diameter or thickness.

If the deformations of an embedded metal wire get to large compared to the diameter or thickness of the wire, the seal may be loosing some of the flexibility.

Thus, in a possible implementation form of the first aspect, the difference in height between a top part and a consecutive bottom part of a bent, bulging or wavelike deformation should be no larger than 5 times said diameter or thickness, such as no larger than 4 times said diameter or thickness, such as no larger than 3 times said diameter or thickness.

In a possible implementation form of the first aspect, each metal wire holding bent, bulging or wavelike deformations has a diameter or thickness, and the distance between two closest arranged consecutive tops of said bent, bulging or wavelike deformations should be no larger than 20 times said diameter or thickness, such as no larger than 17 times said diameter or thickness, such as no larger than 15 times said diameter or thickness, such as no larger than 12 times said diameter or thickness, or such as about 8 times said diameter or thickness.

In a possible implementation form of the first aspect, the distance between two closest arranged consecutive tops of said bent, bulging or wavelike deformations is at least 3 times said diameter or thickness, such as at least 4 times said diameter or thickness, or such as at least 5 times said diameter or thickness.

In a possible implementation form of the first aspect, the flexible outer material has a thickness in the range of 2 to 5 times the diameter or thickness of a metal wire holding bent, bulging or wavelike deformations, such as in the range of 2.5 to 4 times said diameter or thickness, or such as about 3 times said diameter or thickness.

In a possible implementation form of the first aspect, then for at least one, two or three of the embedded elongated metal wires, at least part of the metal wire holds three or more of said bent, bulging or wavelike deformations in the longitudinal direction of the wire.

In a possible implementation form of the first aspect, then for several or all of the plurality of elongated metal wires, at least part of said metal wires holds several bent, bulging or wavelike deformations in the longitudinal direction.

In a possible implementation form of the first aspect, said several bent, bulging or wavelike deformations are arranged consecutively in the longitudinal direction.

In a possible implementation form of the first aspect, said bent, bulging or wavelike deformations extend substantially perpendicular to a plane defined by the lengthwise and widthwise directions of the reinforced flexible seal.

In a possible implementation form of the first aspect, the flexible outer material, in which the at least one metal wire holding bent, bulging or wavelike deformations is embedded, is deformed in accordance with the deformation of said metal wire(s). Thus, at least part of the reinforced flexible seal may be deformed by said bent, bulging or wavelike deformation of the metal wire(s) and the flexible outer material.

In a possible implementation form of the first aspect, said bent, bulging or wavelike deformations extend substantially parallel to a plane defined by the lengthwise and widthwise directions of the reinforced flexible seal. Thus, in a possible implementation form of the first aspect, the flexible outer material, in which the at least one metal wire holding bent, bulging or wavelike deformations is embedded, has substantially no deformations or holds deformations being smaller than the deformation of said metal wire(s).

In a possible implementation form of the first aspect, at least part of or all of said plurality of elongated metal wires embedded in the flexible outer material are running substantially in parallel to each other within the flexible outer material.

In a possible implementation form of the first aspect, several of said parallel running metal wires holds said several bent, bulging or wavelike deformations in the longitudinal direction.

In a possible implementation form of the first aspect, then for at least two parallel running metal wires, the bent, bulging or wavelike deformations of one wire are positioned parallel to the bent, bulging or wavelike deformations of a neighbouring parallel wire.

In a possible implementation form of the first aspect, then for at least part of or all of said plurality of elongated metal wires embedded in the flexible outer material, the distance between two neighbouring wires does not exceed a predetermined maximum distance. In a possible implementation form of the first aspect, the reinforced flexible seal has a lower or outer edge, and the spacing between said lower or outer edge and a lower- or outermost positioned elongated metal wire is smaller than said predetermined maximum distance.

In a possible implementation form of the first aspect, said bent, bulging or wavelike deformations in the longitudinal direction of a wire are similarly shaped or deformed.

In a possible implementation form of the first aspect, said bent, bulging or wavelike deformations in the longitudinal direction of a wire are arranged with substantially equal spacing. In a possible implementation form of the first aspect, the reinforced flexible seal has a lower or outer edge, and the spacing between said lower or outer edge and a lower- or outermost positioned elongated metal wire is smaller than said substantially equal spacing.

In a possible implementation form of the first aspect, said several bent, bulging or wavelike deformations in the longitudinal direction comprises at least 2, such as at least 3, such as at least 4, or such as at least 5 consecutive bent, bulging or wavelike deformations.

In a possible implementation form of the first aspect, the flexible outer material has a substantially constant thickness. The flexible outer material may have a thickness in the range of 2 to 5 mm, such as in the range of 2.5 to 4 mm, such as about 3 mm.

The flexible material outer material may have a has a width of up to 120 cm, such as up to 100 cm, such as up to 80 cm, such as up 50 cm, such as up to 40 cm, such as in the range of 1.5 to 30 cm, such as in the range of 2 to 25 cm, such as in the range of 2 to 20 cm, such as in the range of 2 to 15 cm, such as in the range of 4 to 10 cm, such as in the range of 5 to 9 cm, such as about 8 cm or 7.5 cm.

The elongated metal wires may have a thickness or diameter equal to or no less than 0.8 mm, such as equal to or no less than 0.9 mm, such as equal to or no less than 1 mm, or such as equal to or no less than 1.1 mm.

The distance between two closest arranged consecutive tops of said bent, bulging or wavelike deformations may be no larger than 20 mm, such as no larger than 17 mm, such as no larger than 15 mm, or such as about 12 mm or about 8 mm.

The difference in height between a top part and a consecutive bottom part of a bent, bulging or wavelike deformation may be in the range of 0.5 to 10 mm, such as in the range of 0.5 to 5 mm, such as in the range of 0.5 to 3 mm, such as about 1 or 2 mm.

In a possible implementation form of the first aspect, only elongated metal wires are embedded in the flexible outer material of the reinforced flexible seal.

In a possible implementation form of the first aspect, all the elongated metal wires of the reinforced flexible seal are arranged substantially parallel to each other, and the successively arranged elongated metal wires are arranged with substantially equal spacing.

In a possible implementation form of the first aspect, at least part of or all the elongated metal wires extend in the whole length of the flexible seal.

In a possible implementation form of the first aspect, the flexible outer material comprises a flexible plastic material, such as flexible polyvinyl chloride, PVC, and/or wherein the flexible outer material comprises a rubber material.

In a possible implementation form of the first aspect, the flexible outer material comprises a thermoplastic elastomer, TPE, type material.

In a possible implementation form of the first aspect, the flexible outer material has a shore hardness, Shore A, of not below 40, such as not below 50, such as not below 60, such as not below 65, such as not below 70, such as not below 75, such as in the range of 75-80.

In a possible implementation form of the first aspect, the flexible outer material comprises a thermoplastic vulcanizates, TPV, type material, such as a polymer material selected from the range of Santoprene™ materials, such as Santoprene™ 201-73.

In a possible implementation form of the first aspect, the thickness of the flexible outer material and the Shore A hardness score of the flexible outer material are selected such that the result of a multiplication of the thickness of the flexible outer material in mm by the Shore A score is a number in the range of 175-275, such as 190-275, such as 200-260, such as 210-250, or such as 220-240.

In a possible implementation form of the first aspect, at least part of or all of said metal wires are arranged at a distance to each other being no larger than 8 mm, such as no larger than 7 mm, such as no larger than 6 mm, such as no larger than 5 mm, or such as no larger than 4 mm.

In a possible implementation form of the first aspect, the metal wires are made of one or more of the following five materials or alloys thereof: a) iron b) steel c) stainless steel, d) spring steel e) welding wire filler metal such as 308L filler metal.

In a possible implementation form of the first aspect, the metal wires or part of the metal wires can also be formed as narrow metal strips having a width and a thickness, where the width may be substantially equal to the thickness of the narrow metal strips, or in the range of one to two or three times the thickness of the narrow metal strips.

In a possible implementation form of the first aspect, the reinforced the flexible seal has an upper part and a bottom part, and a brush or fibre material, such as a fibre or brush strip, is attached to or integrated into the bottom part of the reinforced flexible seal and extends below said reinforced flexible seal. Here, the brush or fibre material may extend further in the lengthwise direction of the flexible structure.

According to a second aspect, there is provided a seal assembly comprising a reinforced flexible seal according to any one of the implementations forms of the first aspect, and at least one connector for connecting the reinforced flexible seal to a wall, fence, door, port or window edge.

According to a third aspect, there is provided a sealed wall, fence, door, port or window assembly comprising:
  a wall, fence, door, door leaf or wing, port or window with
      a lower or outer edge, and
  a reinforced flexible seal or seal assembly according to any one of the implementations forms of the first and second aspects, wherein the reinforced flexible seal is connected to the lower or outer edge of the wall, fence, door, door leaf or wing, port or window.

In a possible implementation form of the third aspect, an upper or connection part of the reinforced flexible seal is connected to the lower or outer edge of the wall, fence, door, door leaf or wing, port or window, and a lower or sealing part of the reinforced flexible seal extends below said lower edge or further out from said outer edge, wherein said lower or sealing part of the seal comprises several of said embedded metal wires running in the longitudinal direction of the seal and holding said bent, bulging or wavelike deformations. In a possible implementation form of the third aspect, the elongated metal wires of the lower or sealing part of the flexible seal extend substantially parallel to the longitudinal direction of said lower or outer edge. In a possible implementation form of the third aspect, the elongated metal wires running in the lower or sealing part of the flexible seal are arranged with increasing distance to said lower or outer edge.

Thus, the lower part of the seal extending from the lower or outer edge of the wall, fence, door, door leaf or wing, port or window provides a barrier or seal to avoid the entrance of unwanted animals below the door. There may not be a need for reinforcing metal wires in the upper or connecting part of the reinforced flexible seal. Therefore, in a possible implementation form of the third aspect, the upper or connection part of the reinforced flexible seal has no embedded metal wires, or only a part of the upper or connection part of the reinforced flexible seal has embedded metal wires.

According to a fourth aspect, there is provided a sealed wall, fence, door, door leaf or wing, port or window assembly for sealing a space between an edge of a wall, fence, door, port or window door or window and an adjacent surface to avoid entrance of animals, insects, or water between the edge of the door or window and the surface, or to avoid temperature changes across the sealed space, said door or window assembly comprising:

a wall, fence, door, door leaf or wing, port or window with an outer edge, and a reinforced flexible seal or seal assembly according to any one of the implementations forms of the first and second aspects, wherein the reinforced flexible seal is connected to the outer edge of the wall, fence, door, door leaf or wing, port or window.

In a possible implementation form of the fourth aspect, an upper or connection part of the reinforced flexible seal is connected to the lower or outer edge of the wall, fence, door, door leaf or wing, port or window, and a lower or sealing part of the reinforced flexible seal extends below said lower edge or further out from said outer edge, wherein said lower or sealing part of the seal comprises several of said embedded metal wires running in the longitudinal direction of the seal and holding said bent, bulging or wavelike deformations. In a possible implementation form of the fourth aspect, the elongated metal wires of the sealing part of the flexible seal extend substantially parallel to the longitudinal direction of said lower or outer edge. In a possible implementation form of the fourth aspect, the elongated metal wires running in the sealing part of the flexible seal are arranged with increasing distance to said lower or outer edge.

In a possible implementation form of the fourth aspect, the upper or connection part of the reinforced flexible seal has no embedded metal wires, or only a part of the upper or connection part of the reinforced flexible seal has embedded metal wires.

In a possible implementation form of the third or fourth aspect, the reinforced flexible seal comprises a mounting or connection part and a sealing part, the sealing part comprises several of said metal wires embedded in the flexible outer material and running in the longitudinal direction of the seal and holding bent, bulging or wavelike deformations, and at least part of the mounting or connection part is connected to the wall, fence, door, door leaf or wing, port or window edge and at least part of the sealing part is positioned free from the wall, fence, door, door leaf or wing, port or window edge.

According to a fifth aspect, there is provided a method for forming a number of bent, bulging or wavelike deformations in a reinforced flexible seal having a width and a length, said reinforced flexible seal comprising a flexible outer material and a plurality of elongated metal wires embedded in the flexible outer material and running substantially in a longitudinal direction of the reinforced flexible seal with at least part of said elongated metal wires arranged at a distance to each other, said method comprising:

providing a roll processing system with two toothed gear-wheels or rolls, each holding a number of roller teeth, wherein the two gear-wheels or rolls are arranged for rotating around two parallel axes with the two gear-wheels or rolls facing each other with at least partly interconnecting teeth;

placing the reinforced flexible seal between the teeth of the two gear-wheels or rolls with the embedded metal wires extending substantially perpendicular to the rotation axes; and moving the reinforced flexible seal through the at least partly interconnecting teeth of the two gear-wheels or rolls while rotating said gear-wheels or rolls, whereby a pressure is provided on each sides of the reinforced flexible seal by the teeth of the gear-wheels or rolls, said pressure providing a number of consecutive bent, bulging or wavelike deformations in said reinforced flexible seal, said deformation including a deformation of at least part of the metal wires embedded in the flexible outer material.

In a possible implementation form of the method of the fifth aspect, the teeth of said gear-wheels or rolls have a bowed outer edge.

In a possible implementation form of the method of the fifth aspect, wherein after the formation of the number of bent, bulging or wavelike deformations in the reinforced flexible seal, the method further comprises providing the flexible outer material of the reinforced flexible seal holding the bent, bulging or wavelike deformations with an additional flexible outer material, said additional flexible outer material being provided on one or both side surfaces of the reinforced flexible seal. In a possible implementation form of the method of the fifth aspect, the additional flexible outer material on one or both side surfaces may have a substantially planar outer surface. Thus, the resulting reinforced flexible seal may thereby be provided with one or two planar outer surfaces.

In a possible implementation form of the method of the fifth aspect, the additional flexible outer material is added to the flexible outer material of the reinforced flexible seal by use of an extrusion process or insert molding.

According to the fifth aspect, there is also provided a roll processing system for forming a number of bent, bulging or wavelike deformations in a reinforced flexible seal having a width and a length, said reinforced flexible seal comprising a flexible outer material and a plurality of elongated metal wires embedded in the flexible outer material and running substantially in a longitudinal direction of the reinforced flexible seal with at least part of said elongated metal wires arranged at a distance to each other, said roll processing system comprising:

two toothed gear-wheels or rolls, each holding a number of roller teeth, wherein the two gear-wheels or rolls are arranged for rotating around two parallel axes with the two gear-wheels or rolls facing each other with at least partly interconnecting teeth; and a feed support positioned for directing the reinforced flexible seal between the teeth of the two gear-wheels or rolls with the embedded metal wires extending substantially perpendicular to the rotation axes.

In a possible implementation form of the system of the fifth aspect, the teeth of said gear-wheels or rolls have a bowed outer edge.

The object of the invention may also be achieved in accordance with a sixth aspect by providing a flexible and oblong blade door seal for sealing a gap or space, such as a gap or space between an edge of a wall, fence, door, port or window and a surface adjacent to the wall, fence, door, port or window, said blade door seal having a sealing section, and a mounting section by means of which the blade door seal can be mounted on the door leaf, said blade door seal comprising a flexible outer material, and a barrier embedded in at least the part of the flexible outer material corresponding to the sealing section, said barrier comprising a plurality of elongated metal members arranged at a distance to each other substantially in parallel to the longitudinal direction of the oblong blade door seal, where at least a part of at least one of the metal members is provided with 3 or more bends or stable bends e.g. bends selected from: a) a curve-shaped bend, b) a bulging deformation, c) a wave-shaped bend and d) a wave-like deformation.

In a possible implementation form of the sixth aspect, the gap is the threshold gap under a door, door leaf or door wing.

In a possible implementation for of the sixth aspect, the plurality of elongated metal members comprises at least one metal component selected from: a) a plurality of embedded metal wires, b) a plurality of embedded narrow metal strips, and c) at least one embedded metal wire and at least one embedded narrow metal strip.

In a possible implementation for of the sixth aspect, at least half of the sealing section is flexible around an axis parallel to the longitudinal direction of the blade door seal.

In a possible implementation for of the sixth aspect, the mounting section comprises a plurality of elongated metal members arranged at a distance to each other substantially in parallel to the longitudinal direction of the oblong blade door seal and where said elongated metal members comprise at least one metal component selected from: a) a plurality of embedded metal wires, b) a plurality of embedded narrow metal strips, and c) at least one embedded metal wire and at least one embedded narrow metal strip.

In a possible implementation for of the sixth aspect, the elongated metal members of the barrier in the sealing section comprises at least two members selected from:
a) an embedded metal wire with a diameter of at least 0.4 mm, and
b) an embedded narrow metal strip with a thickness of at least 0.4 mm and a width of at least 0.6 mm,
wherein the distance between the adjacent elongated metal members is no larger than 20 mm.

In a possible implementation for of the sixth aspect, the elongated metal members of the barrier in the sealing section is made of metals selected from: a) iron, b) steel, c) stainless steel, d) spring steel, and e) welding wire filler metal.

In a possible implementation for of the sixth aspect, the flexible outer material of at least the sealing section comprises a flexible polymer material, e.g. a thermoplastic elastomer In a possible implementation for of the sixth aspect, the flexible outer material has a flattened form with uniform thickness in the range of 2-30 mm and a uniform width in the range of 4-15 cm.

In a possible implementation for of the sixth aspect, a fastener is mounted on opposite sides of a part of the outer flexible material of the sealing section in such a way that it compresses said part of the outer flexible material and thereby increases the friction between said part of the outer flexible material and the elongated metal members embedded therein.

In a possible implementation for of the sixth aspect, at least one end part of the blade door seal is bent in an angle of 60-180 degrees, preferably about 90 or about 180 degrees.

In a possible implementation for of the sixth aspect, at least one of the elongated metal members of the barrier is selected from:
a) a solid single stranded wire with a surface being at least one of the following: i) uneven ii) coated with a primer iii) coated with another sort of adhesive coating
b) a solid narrow metal strip with a surface being at least one of the following: i) uneven ii) coated with a primer iii) coated with another sort of adhesive coating and
c) a multi-stranded wire.

In a possible implementation for of the sixth aspect, there is provided a double-sided tape on one side of the mounting section.

In a possible implementation for of the sixth aspect, the blade door seal is flexible around an axis parallel to the longitudinal direction of the blade door seal as well as around an axis perpendicular to the longitudinal direction of the blade door seal, and where the flexibility around the axis parallel to the longitudinal direction of the blade door seal is substantially larger than the flexibility around the axis perpendicular to the longitudinal direction of the blade door seal.

In a possible implementation for of the sixth aspect, the blade door seal is provided with markings indicating recommended positions for placing rivets, screws, screw bolts and nails.

According to a seventh aspect there is provided a method of securing a door in a building, a door in a wall or a door in a fence against pests such as rats and mice, said method comprising the step of mounting a blade seal on a door leaf of the door, said blade seal having
a sealing section, and
a mounting section by means of which the blade door seal can be mounted on the door leaf,
said blade door seal comprising
a flexible outer material, and
a barrier embedded in at least the part of the flexible outer material corresponding to the sealing section, said barrier comprising a plurality of elongated metal members arranged at a distance to each other substantially in parallel to the longitudinal direction of the oblong blade door seal, where at least a part of at least one of the metal members is provided with 3 or more stable bends e.g. bends selected from: a) a curve-shaped bend, b) a bulging deformation, c) a wave-shaped bend and d) a wave-like deformation.

According to an eight aspect there is provided a method of securing or sealing a space between an edge of a wall, fence, door, port or window and an adjacent surface to avoid entrance of animals, insects, or water between the edge of the wall, fence, door, port or window and the surface, or to avoid temperature changes across the sealed space, said method comprising the step of mounting a reinforced seal or seal assembly according to any one of the implementations forms of the first and second aspects, or mounting a blade door seal according to any one of the implementations forms of the sixth aspect close to the edge of the wall, fence, door, port or window, with a sealing part or sealing section extending outwards from said edge or extending below said edge.

It should be understood that it is also within one or more possible implementation forms of the seal of the first aspect, that the seal is selected from any of the implementation forms of the seal of the sixth aspect.

It should be understood that it is also within one or more possible implementation forms of the seal of the sixth aspect, that seal is selected from any of the implementation forms of the seal of the first aspect.

The foregoing and other objects are achieved by the features of the independent claims. Further implementation forms are apparent from the dependent claims, the description and the figures. These and other aspects of the invention will be apparent from the embodiments described below.

BRIEF DESCRIPTION OF THE DRAWINGS

In the following detailed portion of the present disclosure, the invention will be explained in more detail with reference to the example embodiments shown in the drawings, in which.

DETAILED DESCRIPTION

Figure 1:
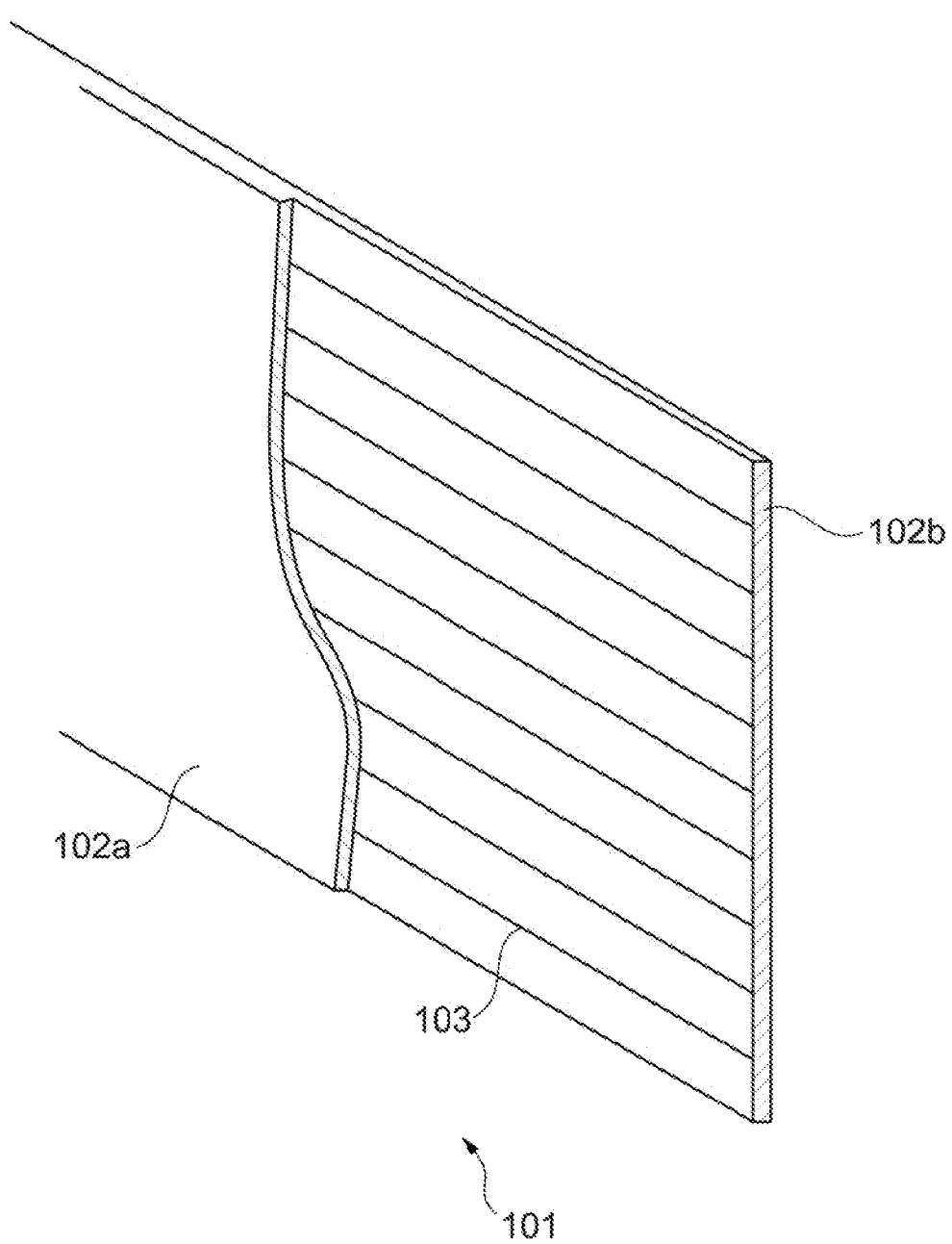
FIG. 1 is a partially cut away perspective view of a reinforced flexible structure or seal without deformations according to a first example embodiment.
Figure 2:
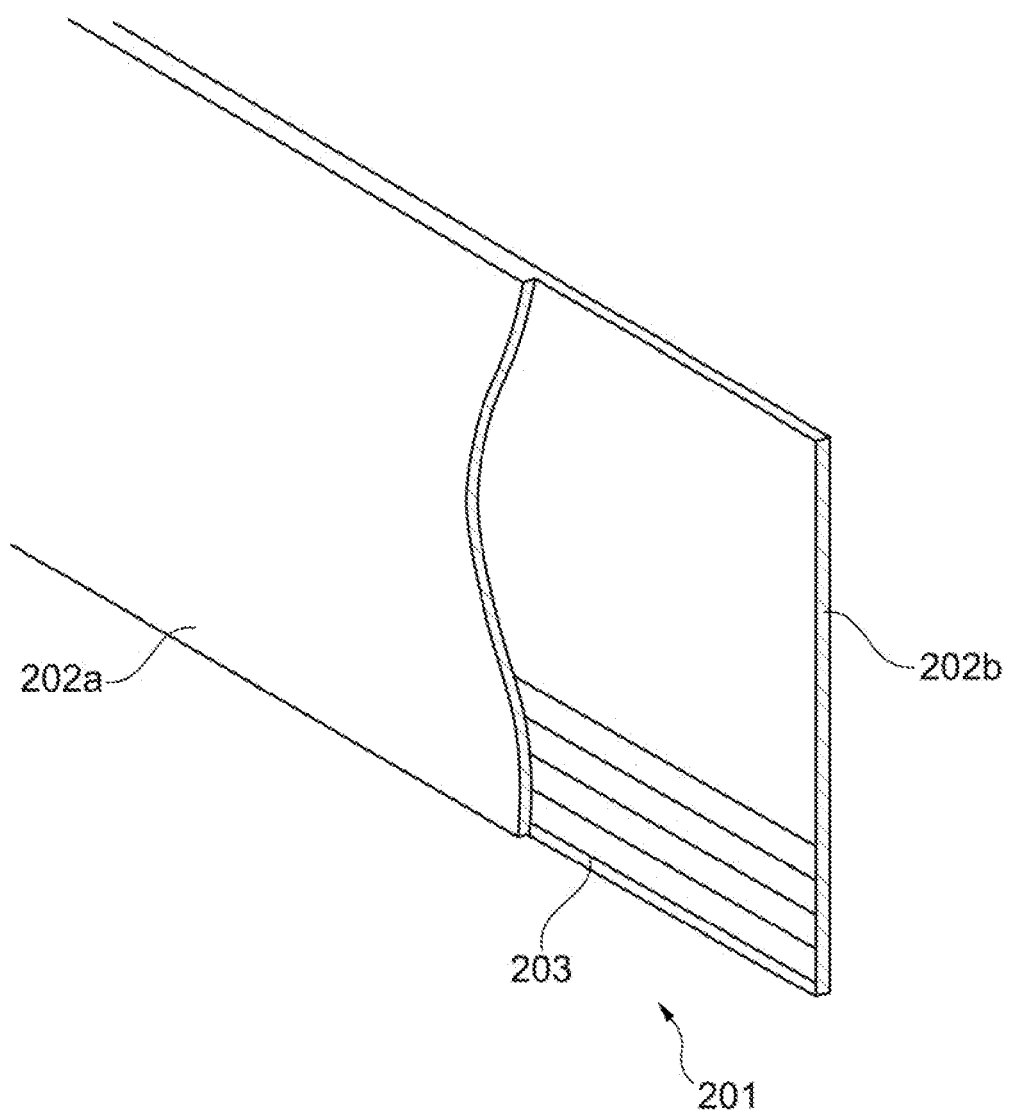
FIG. 2 is a partially cut away perspective view of a reinforced flexible structure or seal without deformations according to a second example embodiment.

FIG. 1 is a partially cut away perspective view of a reinforced flexible structure or seal 101 without deformations according to a first example embodiment, and FIG. 2 is a partially cut away perspective view of a reinforced flexible structure or seal 201 without deformations according to a second example embodiment.

Each of the structures or seals 101 and 201 has a flexible outer material with a first side part 102a, 202a and a second side part 102b, 202b, encompassing or enclosing a plurality of elongated metal members or metal wires 103, 203, where each of the wires 103, 203 run substantially in parallel to each other. The wires 103 and 203 run substantially in parallel to each other. The flexible structure or seal 101 and 201 may have a substantial longitudinal extension, and the elongated metal members or metal wires 103, 203 may run substantially in the longitudinal direction of the structure or seal 101, 201. The substantially parallel elongated metal members or metal wires 103, 203 are arranged at a distance to each other, and it is preferred that the elongated metal members or metal wires 103, 203 are arranged with a substantially equal spacing. It is preferred that the flexible outer material 102a, 102b, 202a, 202b encompasses or encloses the parallel elongated metal members or metal wires 103, 203 only.

The flexible outer material 102a, 102b, 202a, 202b may have a flattened form with a substantially constant thickness. The flexible outer material 102a, 102b, 202a, 202b may be made of a flexible polymer or plastic material, such as flexible polyvinyl chloride, PVC, and/or a flexible rubber material, and may have a thickness in the range of 2 to 30 mm, such as in the range of 2 to 20 mm, such as in the range of 2 to 10 mm, such as in the range of 2 to 5 mm, such as in the range of 2.5 to 4 mm, such as about 3 mm.

In order to use the structures or seals 101, 201 the wires shall be dimensioned and made of a material, which the rats and/or mice cannot bite them a way through. Thus, the wires shall have a thickness and be made of a material, which the rats and/or mice cannot bite through, and also the distance between the wires shall be so small, that the rats and/or mice cannot move in between the wires.

The wires 103, 203 may therefore be arranged at a distance to each other which is no larger than 20 mm, such as no larger than 19 mm, such as no larger than 18 mm, such as no larger than 17 mm, such as no larger than 15 mm, such as no larger than 12 mm, such as no larger than 10 mm, such as no larger than 9 mm, such as no larger than 8 mm, such as no larger than 7 mm, such as no larger than 6 mm, such as no larger than 5 mm, such as no larger than 4 mm, such as no larger than 3 mm, or such as no larger than 2 mm. Here, it is preferred that the distance between the wires 103, 203 is equal to or no larger than 8 mm, equal to or no larger than 7 mm, equal to or no larger than 6 mm, equal to or no larger than 5 mm, or equal to or no larger than 4 mm.

The wires 103, 203 may be made of steel or stainless steel or spring steel, or the wires may be made of iron. The wires 103, 203 may also be made as flexible metal wires, such as braided or twisted wires. The metal wires 103, 203 can also be formed as narrow metal strips having a width, which may be substantially equal to the thickness of the narrow metal strips, or in the range of one to two or three times the thickness of the narrow metal strips.

The wires or thin metal strips 103, 203 may have a thickness or diameter equal to or no less than 0.4 mm, equal to or no less than 0.6 mm, equal to or no less than 0.7 mm, equal to or no less than 0.8 mm, equal to or no less than 0.9 mm, equal to or no less than 1 mm, equal to or no less than 1.1 mm, equal to or no less than 1.2 mm, equal to or no less than 1.2 mm, equal to or no less than 1.3 mm, equal to or no less than 1.4 mm, equal to or no less than 1.5 mm, equal to or no less than 1.6 mm, equal to or no less than 1.7 mm, equal to or no less than 1.8 mm, equal to or no less than 1.9 mm, equal to or no less than 2.0 mm, equal to or no less than 2.1 mm, equal to or no less than 2.2 mm, equal to or no less than 2.4 mm, equal to or no less than 2.7 mm, or equal to or no less than 3 mm.

When the wires 103, 203 are formed as metal strips, the metal strips may have a width equal to or no less than 1 mm, equal to or no less than 1.5 mm, equal to or no less than 2 mm, or equal to or no less than 2.5 mm.

The flexible structure 101, 201 may have different widths, but when used for sealing, the structure 101, 201 may have a width in the range of 1.5 to 30 cm, such as in the range of 2 to 25 cm, such as in the range of 2 to 20 cm, such as in the range of 2 to 15 cm, such as in the range of 4 to 10 cm, such as in the range of 5 to 9 cm, such as about 8 cm or 7.5 cm.

By having the metal wires 103, 203 running substantially in parallel, the structure 101, 201 can bend or flex about an axis being substantially parallel to the metal wires 103, 203, whereas bending or flexing of the structure 101, 201 about an axis perpendicular to the parallel metal wires 103, 203 will be rather limited due to the stiffness of the metal wires 103, 203.

The structure or seal 201 of FIG. 2 is substantially equal to the structure or seal 101 of FIG. 1, but some metal wires 203 may be omitted in the upper part of the structure 201.

One of the problems with the structures 101 and 201 is that when the structure 101, 201, is used for example as a seal or barrier at the bottom of a door or at and edge of a door leaf, the opening and closing of the door may bend the lower part of the structure 101, 201 back and forth along an axis substantial parallel to the metal wires 103, 203, which bending may cause the metal wires 103, 203 to move relative to the flexible outer material 102, 202. The result may be that for an end part of the structure 101, 201, part of the metal wires 103, 203 may extend outside the end part of the flexible outer material 102, 202. A solution to this problem may be to provide deformations along the metal wires 103, 203 being embedded or enclosed in the flexible outer material 102, 202. This is further illustrated in FIGS. 3 and 4.

Figure 3:
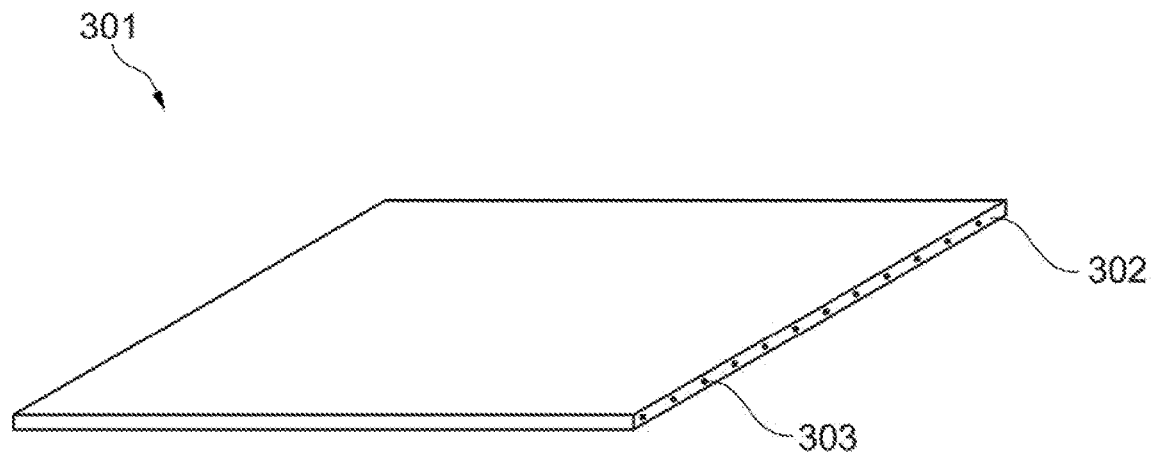
FIG. 3 is a perspective view of a reinforced flexible structure or seal without deformations according to an example embodiment.

FIG. 3 is a perspective view of a reinforced flexible structure or seal 301 without deformations. The seal 301 may be equal to any of the above discussed seals 101 and 201, and thus has a flexible outer material 302 encompassing or enclosing a plurality of elongated metal members or metal wires 303, where the wires 303 run substantially in parallel to each other. There may be metal wires 303 in the whole width of the seal 301, as for the seal 101, or there may be metal wires 303 in only a part of the width of the seal as for the seal 201.

The seals 101, 201 and 301 may be produced by an extrusion process as further described in connection with FIGS. 9, 10 and 11.

Figure 4A:
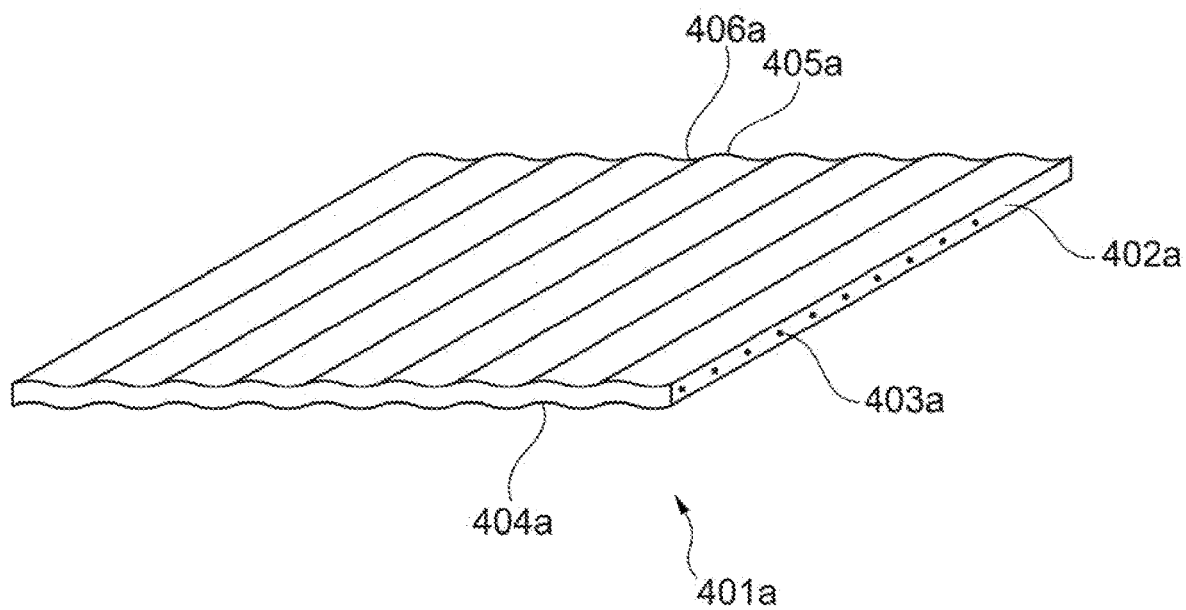
FIG. 4a is a perspective view of a reinforced flexible structure or seal holding bent, bulging or wavelike deformations according to an example embodiment.

FIG. 4a is a perspective view of a reinforced flexible structure or seal 401a similar to the seal 301, but where the seal 401a is provided with bent, bulging or wavelike deformations 404a. The seal has a flexible outer material 402a encompassing or enclosing a plurality of elongated metal members or metal wires 403a, where the wires 403a run substantially in parallel to each other.

For the seal 401a, the embedded elongated metal wires 403a hold several bent, bulging or wavelike deformations 404a in the longitudinal direction of the wires 403a. Due to the deformations 404a of the metal wires 403a, the flexible outer material 402a enclosing the metal wires 403a and thereby the outer surfaces of the reinforced flexible seal 401a are deformed accordingly. The metal wires 403a holding the wavelike deformations 404a in the longitudinal direction, run substantially parallel to each other. Thus, the bent, bulging or wavelike deformations 404a extend substantially perpendicular to a plane defined by the lengthwise and widthwise directions of the reinforced flexible seal 401a as illustrated in FIG. 4a.

Figure 4B:
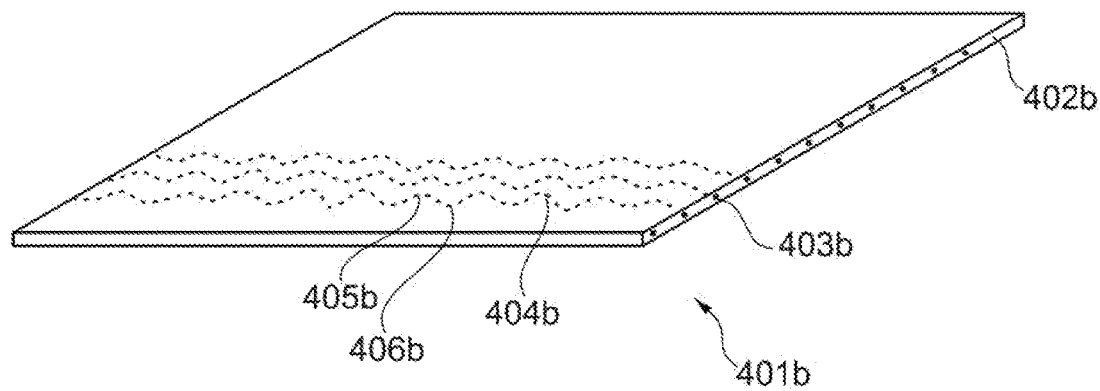
FIG. 4b is a perspective view of a reinforced flexible structure or seal holding bent, bulging or wavelike deformations according to another example embodiment.

FIG. 4b is a perspective view of another reinforced flexible structure or seal 401b similar to the seal 301 but having metal wires 403b provided with bent, bulging or wavelike deformations 404b. The seal has a flexible outer material 402b encompassing or enclosing a plurality of elongated metal members or metal wires 403b, where at least part of the wires 403b of the seal 401b is provided with bent, bulging or wavelike deformations 404b.

For the seal 401b, the embedded elongated metal wires 403b hold several bent, bulging or wavelike deformations 404b in the longitudinal direction of the wires 403b. However, for the seal 401b, the deformations 404b extend substantially parallel to a plane defined by the lengthwise and widthwise directions of the reinforced flexible seal 401b as illustrated in FIG. 4b. Thus, the deformations 404b of the metal wires 403b are within the flexible outer material 402b enclosing the metal wires 403b, as illustrated by the dotted lines showing the deformations 404b in FIG. 4b, and there may be no or only a minor deformation of the outer surfaces of the reinforced flexible seal 401b.

The metal wires 403b holding the bent, bulging or wavelike deformations 404b in the longitudinal direction may be arranged with the deformations 404b running substantially parallel to each other in order to secure that the distance between two neighbouring wires 403b does not exceed a predetermined maximum distance. For the seal 401b of FIG. 4b, only part of the wires 403b are shown to have deformations 404b. However, it is also within an embodiment that all the metal wires 403b of the seal have bulging or wavelike deformations 404b.

By having the metal wires 403a,b deformed by several bent, bulging or wavelike deformations 404a,b while being embedded within the flexible outer material 402a,b, the metal wires 403a,b will be locked within the flexible material 402a,b, and the elongated metal wires 403a,b may not be able to move relative to the flexible material 402a,b, if the flexible seal 401a,b is flexed back and forth relative to a lengthwise direction of the elongated metal wires 403a,b and the flexible seal 401a,b. When the metal wires 403a,b are held in position within the seal 401a,b, the reinforcement of the seal 401a,b is maintained during use.

The bent, bulging or wavelike deformations 404a,b may be bends or stable bends, which may include bent deformations, curve-shaped bends, and/or wave-shaped bends.

The number of metal wires 403a,b provided with said deformations, bends or stable bends 404a,b may be at least 1, such as at least 2, such as at least 3, such as at least 4, such as at least 5, such as at least 7, such as at least 9.

The deformations or bends 404a,b may be evenly distributed over the whole length of the wire 403a,b, or only provided at a part of the wire 403a,b.

The number of deformations or bends 404a,b of the metal wires 403a,b may be at least 3 such as at least 5, such as at least 10, such as at least 15, such as at least 20, such as at least 30, such as at least 40, such as at least 50, such as at least 70, such as at least 100, such as at least 150, such as at least 200.

The number of deformations or bends 404a,b per meter metal wire 403a,b may be at least 3 such as at least 5, such as at least 10, such as at least 15, such as at least 20, such as at least 30, such as at least 40, such as at least 50, such as at least 70, such as at least 100, such as at least 150, such as at least 200.

A minimum deformation of an embedded metal wire 403a,b is needed in order to maintain the position of the metal wire 403a,b within the flexible material 402a,b.

When the deformations or bends 404a,b are wave-shaped, the peak amplitude measured from the core of the wire 403a,b may be at least 0.05 mm, such as at least 0.1 mm, such as at least 0.15 mm, such as at least 0.2 mm, such as at least 0.25 mm, such as at least 0.4 mm, such as at least 0.7 mm, such as at least 1 mm, such as at least 1.5 mm, such as at least 2 mm.

However, if the height difference of the deformations or bends 404a,b get too large, the metal wire 403a,b may work itself through the flexible material 402a,b surrounding the wire 403a, b.

When the deformations or bends 404a,b are wave-shaped, the peak amplitude measured from the core of the wire 403a,b may be no more than 10 mm, such as no more than 8 mm such as no more than 6 mm, such as no more than 4 mm, such as no more than 3 mm.

When the deformations or bends 404a,b are wave-shaped, the wavelength of the waves may be at least 2 mm, such as at least 3 mm, such as at least 4 mm, such as at least 5 mm, such as at least 6 mm, such as at least 7 mm.

When the deformations or bends 404a,b are wave-shaped, the wavelength of the waves may be no more than 30 mm, such as no more than 25 mm such as no more than 20 mm, such as no more than 15 mm, such as no more than 10 mm, such as no more than 8 mm.

When the deformations or bends 404a,b are not wave-shaped, the measure corresponding to the peak amplitude of a wave-shaped bend measured from the core of the wire may be at least 0.05 mm, such as at least 0.1 mm, such as at least 0.15 mm, such as at least 0.2 mm, such as at least 0.25 mm, such as at least 0.4 mm, such as at least 0.7 mm, such as at least 1 mm, such as at least 1.5 mm, such as at least 2 mm.

When the deformations or bends 404a,b are not wave-shaped, the measure corresponding to the peak amplitude of a wave-shaped bend measured from the core of the wire may be no more than 10 mm, such as no more than 8 mm such as no more than 6 mm, such as no more than 4 mm, such as no more than 3 mm.

When the deformations or bends 404a,b are not wave-shaped, the measure corresponding to the wavelength of a wave-shaped bend may be at least 2 mm, such as at least 3 mm, such as at least 4 mm, such as at least 5 mm, such as at least 6 mm, such as at least 7 mm.

When the deformations or bends 404a,b are not wave-shaped the measure corresponding to the wavelength of a wave-shaped bend may be no more than 30 mm, such as no more than 25 mm such as no more than 20 mm, such as no more than 15 mm, such as no more than 10 mm, such as no more than 8 mm.

When the deformations or bends 404a,b are wave-shaped, the ratio between the abovementioned number of bends per meter and the abovementioned peak amplitude measured from the core of the wire 403a,b may be such that the result of a multiplication of said number of bends per meter and said peak amplitude in mm is A) a number in the range of 5-200, such as 10-150, such as 20-100, such as 40-80, such as 50-60 or B) a number in the range of 5-100, such as 10-60, such as 20-40, or C a number in the range of 70-95.

When the deformations or bends 404a,b are not wave-shaped, the ratio between the abovementioned number of bends per meter and the abovementioned measure corresponding to the peak amplitude of a wave-shaped bend measured from the core of the wire 403a,b may be such that the result of a multiplication of said number of bends per meter and said measure in mm is A) a number in the range of 5-200, such as 10-150, such as 20-100, such as 40-80 such as 50-60 or B) a number in the range of 5-100, such as 10-60, such as 20-40, or C) a number in the range of 70-95.

As mentioned above, a minimum deformation of an embedded metal wire 403a,b is needed in order to maintain the position of the metal wire 403a,b within the flexible material 402a,b. For the seal 401a of FIG. 4a and for the seal 401b of FIG. 4b, the deformation or bend, such as a bent, bulging or wavelike deformation 404a,b, has a top part 405a,b and a bottom or lower part 406a,b with a height difference between the highest point of the top part 405a,b and the lowest point of the bottom or lower part 406a,b. Here, the difference in height between the top part 405a,b and a consecutive bottom part 406a,b should be at least ½ of the diameter or thickness of the metal wire 403a,b, such as at least ¾ of the diameter or thickness, such as at least the measure of the diameter or thickness, or such as at least 1½ of said diameter or thickness.

In order to avoid the metal wire 403a,b to work itself through the flexible material 402a,b surrounding the wire 403a,b, the height difference of the bent, bulging or wave-like deformation 404a,b should not get too large. Thus, it is preferred that the difference in height between a top part 405a,b and a consecutive bottom part 406a,b of a deformation or bend, such as a bent, bulging or wavelike deformation 404a,b, is no larger than 5 times the diameter or thickness of the metal wire, such as no larger than 4 times the diameter or thickness, such as no larger than 3 times the diameter or thickness.

In order for the metal wire 403a,b to be held in position within the seal 401a,b, the distance from one deformation or bent, bulging or wavelike deformation 404a,b to the next deformation shall not be too large. Thus, it is preferred that the distance between two closest arranged consecutive tops 405a,b of the bend, bulging or wavelike deformations 404a,b is no larger than 20 times the diameter or thickness of the metal wire 403a,b, such as no larger than 17 times the diameter or thickness, such as no larger than 15 times the diameter or thickness, such as no larger than 12 times the diameter or thickness, or such as about 8 times the diameter or thickness. However, if the distance from one deformation 404a,b to the next deformation gets too small, the metal wire 403a,b may work itself through the flexible material 402a,b. Thus, it is preferred that the distance between two closest arranged consecutive tops 405a,b of the bulging or wavelike deformations 404a,b is at least 5 times the diameter or thickness of the metal wire 403a,b.

It is preferred that the flexible outer material 402a,b has a thickness in the range of 2 to 5 times the diameter or thickness of a metal wire 403a,b holding the bulging or wavelike deformations 404a,b, such as in the range of 2.5 to 4 times the diameter or thickness, or such as about 3 times the diameter or thickness.

For the seal 401a of FIG. 4a, all the deformations, bends, or wavelike deformations 404a are provided for all the wires 403a extending within the seal 401a. However, if a part of the seal 401a is used for connection to a door leaf of door wing, any wires 403a extending within such a connection part may not be deformed, since such a connection part will not be flexed during opening and closing of the door leaf or door wing holding the seal 401a.

For the seals 401a and 401b, the flexible outer material 402a and 402b may have a thickness in the range of 2 to 30 mm, such as in the range of 2 to 20 mm, such as in the range of 2 to 10 mm, such as in the range of 2 to 5 mm, such as in the range of 2.5 to 4 mm, such as about 3 mm. The thickness may be substantially constant.

For the seals 401a and 401b, the flexible outer material 402a, 402b may be made of a plastic material or flexible polymer material. The flexible outer material 402a, 402b may be a material comprising a natural polymer material such as rubber and/or a synthetic polymer material such as synthetic rubber. The flexible outer material 402a, 402b may be a material comprising a thermoplastic elastomer, TPE, material, a thermoplastic vulcanizates, TPV, type material or a polyvinyl chloride, PVC, material. The flexible outer material 402a, 402b may have a shore hardness, Shore A, of not below 40, such as not below 50, such as not below 60, such as not below 65, such as not below 70, such as not below 75, such as in the range of 75-80. For some purposes, even harder material may be used having a shore hardness, Shore A, of not below 80, such as not below 85, such as not below 90.

The flexible outer material 402a, 402b may be a polymer material is selected from the range of Santoprene™ materials, such as Santoprene™ 201-73.

In order to secure that the flexible outer material of the reinforced flexible seals 402a, 402b is able to maintain the enclosing or embedding of the elongated metal wires 403a, 403b, it is important that the combination of material hardness, shore hardness, and material thickness has a sufficient high value. Thus, the ratio between the thickness of the flexible outer material 402a, 402b and the Shore A hardness score of the flexible outer material (indirectly reflecting the flexibility of the material) may be such that the result of a multiplication of the predominant thickness in mm by the Shore A score is a number in the range of 175-275, such as 190-275, such as 200-260, such as 210-250 such as 220-240.

Also, for the seals 401a and 401b, the wires 403a and 403b should preferably have a thickness and be made of a material, which the rats and/or mice cannot bite through, and also the distance between the wires shall be so small, that the rats and/or mice cannot move in between the wires. It is within a preferred embodiment that for at least part of or all of said plurality of elongated metal wires 403a, 403b, the distance between two neighbouring wires does not exceed a predetermined maximum distance. The reinforced flexible seal 401a, 401b, has a lower or outer edge, and it is preferred that the spacing between said lower or outer edge and a lower- or outermost positioned elongated metal wire is smaller than said predetermined maximum distance. It is within a preferred embodiment that the bulging or wavelike deformations in the longitudinal direction of a wire are arranged with substantially equal spacing. The reinforced flexible seal 401a, 401b has a lower or outer edge, and the spacing between said lower or outer edge and a lower- or outermost positioned elongated metal wire should preferably be smaller than said substantially equal spacing.

The wires 403a or 403b may be arranged at a distance to each other which is no larger than 20 mm, such as no larger than 19 mm, such as no larger than 18 mm, such as no larger than 17 mm, such as no larger than 15 mm, such as no larger than 12 mm, such as no larger than 10 mm, such as no larger than 9 mm, such as no larger than 8 mm, such as no larger than 7 mm, such as no larger than 6 mm, such as no larger than 5 mm, such as no larger than 4 mm, such as no larger than 3 mm, or such as no larger than 2 mm. Here, it is preferred that the distance between the wires 403a or 403b is equal to or no larger than 8 mm, equal to or no larger than 7 mm, equal to or no larger than 6 mm, equal to or no larger than 5 mm, or equal to or no larger than 4 mm.

The wires 403a, 403b may be made of steel or stainless steel or spring steel, or the wires may be made of iron. The wires 403a, 403b may also be made as flexible metal wires, such as braided or twisted wires. The metal wires 403a, 403b can also be formed as narrow metal strips having a width, which may be substantially equal to the thickness of the narrow metal strips, or in the range of one to two or three times the thickness of the narrow metal strips. The wires or thin metal strips 403a, 403b may have a thickness or diameter equal to or no less than 0.4 mm, equal to or no less than 0.6 mm, equal to or no less than 0.7 mm, equal to or no less than 0.8 mm, equal to or no less than 0.9 mm, equal to or no less than 1 mm, equal to or no less than 1.1 mm, equal to or no less than 1.2 mm, equal to or no less than 1.2 mm, equal to or no less than 1.3 mm, equal to or no less than 1.4 mm, equal to or no less than 1.5 mm, equal to or no less than 1.6 mm, equal to or no less than 1.7 mm, equal to or no less than 1.8 mm, equal to or no less than 1.9 mm, equal to or no less than 2.0 mm, equal to or no less than 2.1 mm, equal to or no less than 2.2 mm, equal to or no less than 2.4 mm, equal to or no less than 2.7 mm, or equal to or no less than 3 mm. When the wires 403a, 403b are formed as metal strips, the metal strips may have a width equal to or no less than 1 mm, equal to or no less than 1.5 mm, equal to or no less than 2 mm, or equal to or no less than 2.5 mm.

The flexible structure 403a, 403b may have different widths, but when used for sealing, the structure 403a, 403b may have a width in the range of 1.5 to 30 cm, such as in the range of 2 to 25 cm, such as in the range of 2 to 20 cm, such as in the range of 2 to 15 cm, such as in the range of 4 to 10 cm, such as in the range of 5 to 9 cm, such as about 8 cm or 7.5 cm.

Figure 5:
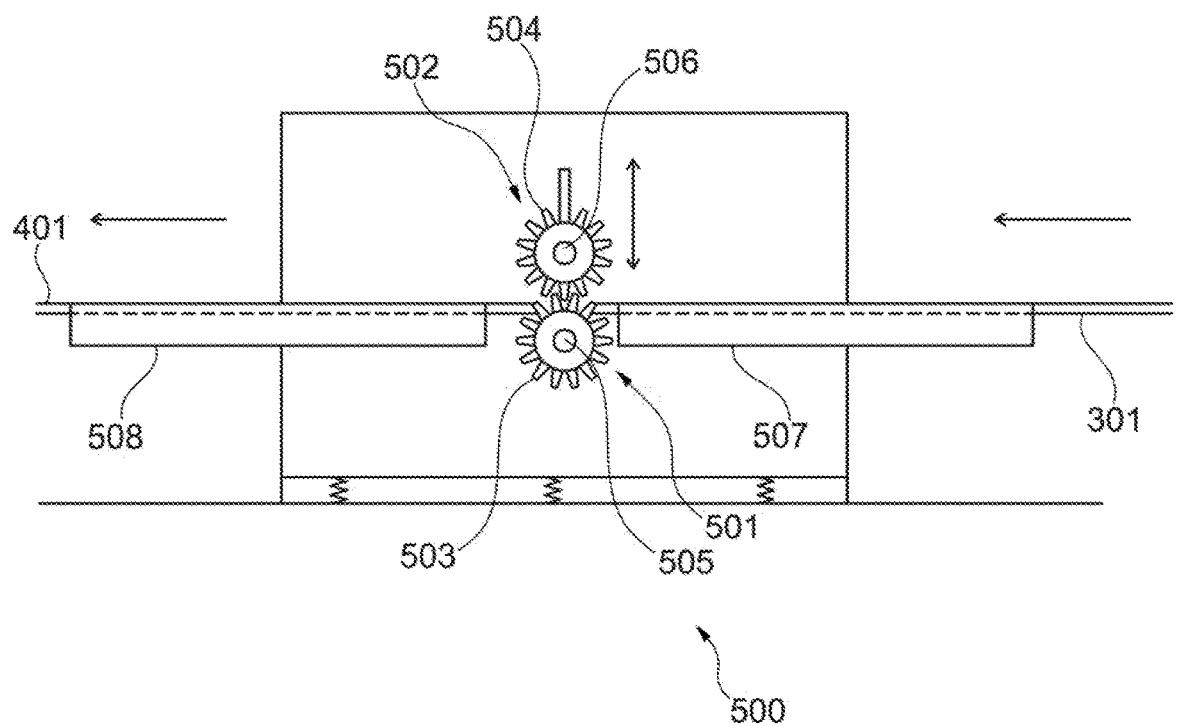
FIG. 5 shows a roll processing system for forming a number of bent, bulging or wavelike deformations in a reinforced flexible seal according to an example embodiment.

The seal 401a of FIG. 4a may be obtained by first producing the seal 301 of FIG. 3, which can be produced by an extrusion process, and then expose the seal 301 to a further process for forming the wavelike deformations 404a, as illustrated in FIG. 5.

The seal 401b of FIG. 4b may be obtained by first producing a number of metal wires 403b holding bulging or wavelike deformations, and then coating the metal wires with a polymer, which can be done by an extrusion process.

FIG. 5 shows a processing system 500 for forming a number of deformations or bends, such as bent, bulging or wavelike deformations, in a reinforced flexible seal, such as the seal 301. The processing system 500 comprises two toothed gear-wheels or rolls 501 and 502, each holding a number of roller teeth 503 and 504, wherein the two gear-wheels or rolls 501, 502 are arranged for rotating around two parallel axes 503 and 504, with the gear-wheels or rolls 501, 502 facing each other with at least partly interconnecting teeth 503, 504. The system 500 further holds a feed support 507 positioned for directing the reinforced flexible seal 301 between the teeth 593, 504 of the two gear-wheels or rolls 501, 502 with the embedded metal wires extending substantially perpendicular to the rotation axes. The system 500 may also hold a seal output support 508 positioned for supporting the now deformed seal 401a coming out from the deforming gear-wheels or rolls 501, 502. In order to avoid sharp corners of the deformed seal 401a and the deformed wires 403a within the seal 401a, the teeth 503, 504 of the gear-wheels or rolls 501, 502 should a bowed outer edge.

The seal 301 with no wavelike deformations may be placed on the feed support 507 between the teeth 503, 504 of the two gear-wheels or rolls 501, 502 with the embedded metal wires 303 extending substantially perpendicular to the rotation axes 505, 506. The seal 301 can then be moved through the at least partly interconnecting teeth 503, 504 of the two gear-wheels or rolls 501, 502 while these are rotated, whereby a pressure is provided on each sides of the reinforced flexible seal 301 by the teeth 503, 504 of the gear-wheels or rolls 501, 502. This pressure provides a number of consecutive bulging or wavelike deformations 404a in the now deformed seal 401a.

For some applications there may be a need for providing the deformed seal 401a with a substantially flat outer surface on one or both side surfaces. This can be obtained by providing the flexible outer material 402a of the reinforced flexible seal 401a holding the bulging or wavelike deformations 404a with an additional flexible outer material. The additional flexible outer material may be provided on one or both side surfaces of the reinforced flexible seal 401a, where the additional flexible outer material on one or both side surfaces may have a substantially planar outer surface. The additional flexible outer material may be added to the flexible outer material 402a of the reinforced flexible seal 401a by use of an extrusion process or insert molding.

Figure 6:
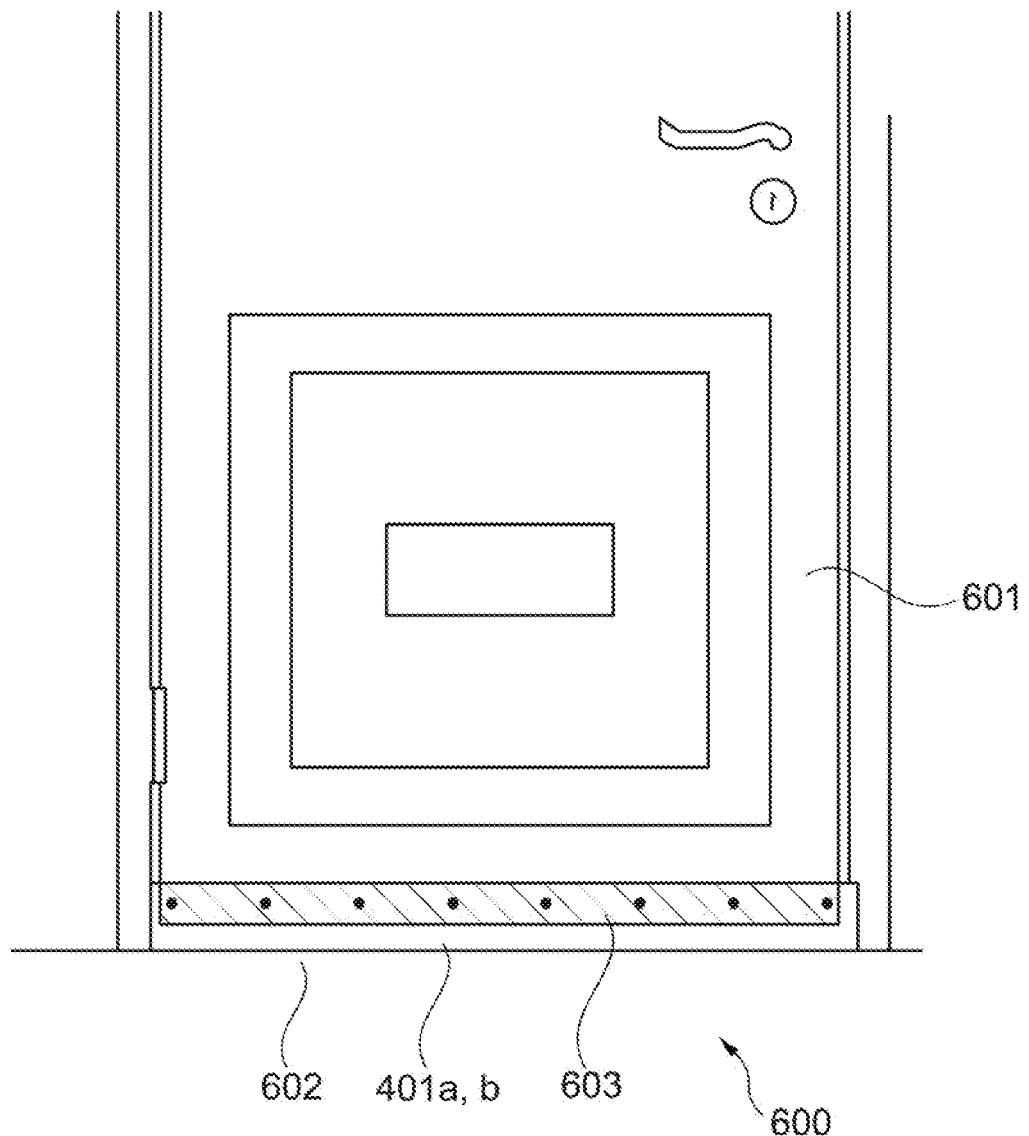
FIG. 6 is an isometric illustration of a lower edge door sealing assembly according to an example embodiment.

According to one or more embodiments of the disclosure, the flexible seal 401a,b can be used for door sealing in order to prevent animals or vermin from entering at the perimeter of the door when shut. This is illustrated in FIG. 6, which is an isometric illustration of a lower edge door sealing assembly 600 according to an example embodiment. The seal assembly 600 of FIG. 6 is arranged for sealing a space between a lower edge of a door 601 and an adjacent surface 602 to avoid entrance of animals between the edge or lower edge of the door 601 and the surface 602. The seal assembly 600 comprises a flexible seal 401a or 401b as discussed in connection with FIGS. 4a and 4b. The seal assembly 600 may have at least one connector or connecting plate 603, which may be made of steel or stainless steel, and which connects an upper or connection part of the reinforced flexible seal 401a,b to the edge of the door 601. The lower part of the seal 401a,b, which extends below the lower edge of the door or door wing 601, holds several metal wires 403, which hold the bulging or wavelike deformations 404a,b, and which run in the longitudinal direction of the seal 401a,b and substantially parallel to the door edge. Thus, the lower part of the seal 401a,b extending below the lower edge of the door or door leaf 601, provides a barrier or seal to avoid the entrance of unwanted animals below the door 601.

Due to the wavelike deformations 404a,b in the longitudinal direction of metal wires 403a,b of the seal 401a,b, the metal wires 403a,b in the lower part of the seal 401a,b are maintained in their position within the seal 401a,b when the door or door leaf 601 is open and closed.

Figure 7:
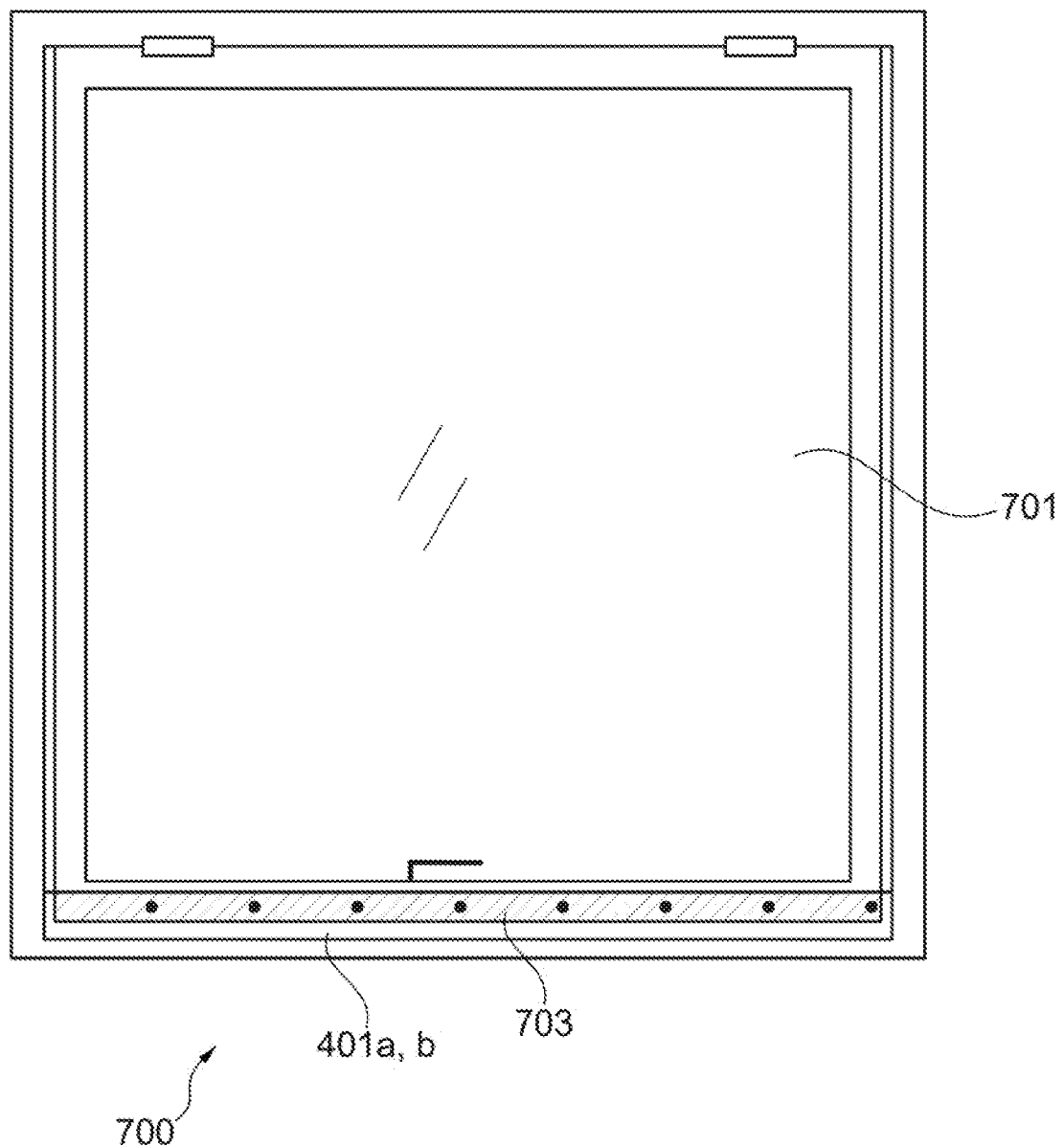
FIG. 7 shows a lower edge window sealing assembly according to an example embodiment.

According to one or more embodiments of the disclosure, the flexible structure 401a,b can also be used for sealing a window 701 in order to prevent animals or vermin from entering through the perimeter of the window 701 when shut. This is illustrated in FIG. 7, which shows a lower edge window sealing assembly 700 according to an example embodiment. It is preferred that the sealing assembly 700 has a flexible seal 401a or 401b of the type as described in connection with FIGS. 4a and 4b. The seal 401a,b is connected to a lower frame edge of the window 701 by a connecting plate 703, which may be made of steel or stainless steel.

Figure 8:
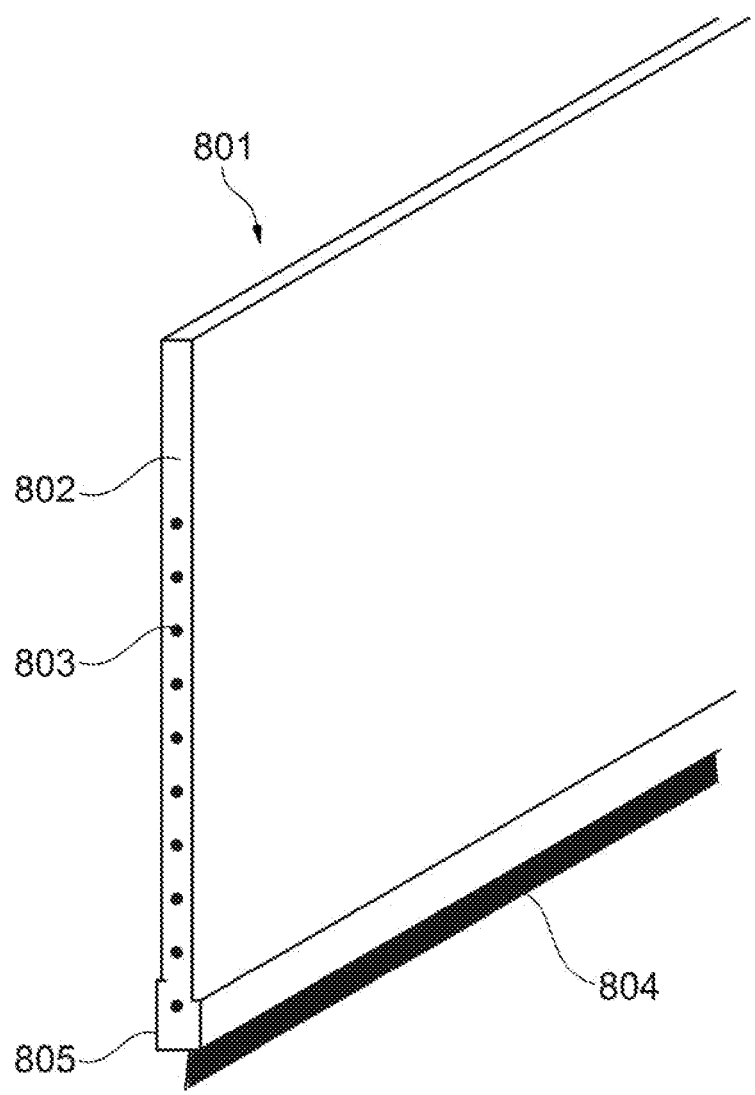
FIG. 8 illustrates a seal combination of a reinforced flexible structure or seal provided with a brush or fibre material according to an example embodiment.

FIG. 8 illustrates a seal combination of a reinforced flexible structure or seal 801 provided with a brush or fibre material 804 according to an example embodiment. The seal 801 has an outer flexible material 802, in which a number of metal wires 803 are embedded. It is preferred that the seal 801 is similar to the seal 401a or 401b discussed in connection with FIGS. 4a and 4b, with wavelike deformations in the longitudinal direction of metal wires 803 of the seal 801, which deformations are not shown in FIG. 8. The brush or fibre material 804, such as a fibre or brush strip, is attached to or integrated into a bottom part 805 of the reinforced flexible seal 801 and extends below said reinforced flexible seal 801.

Figure 9A:
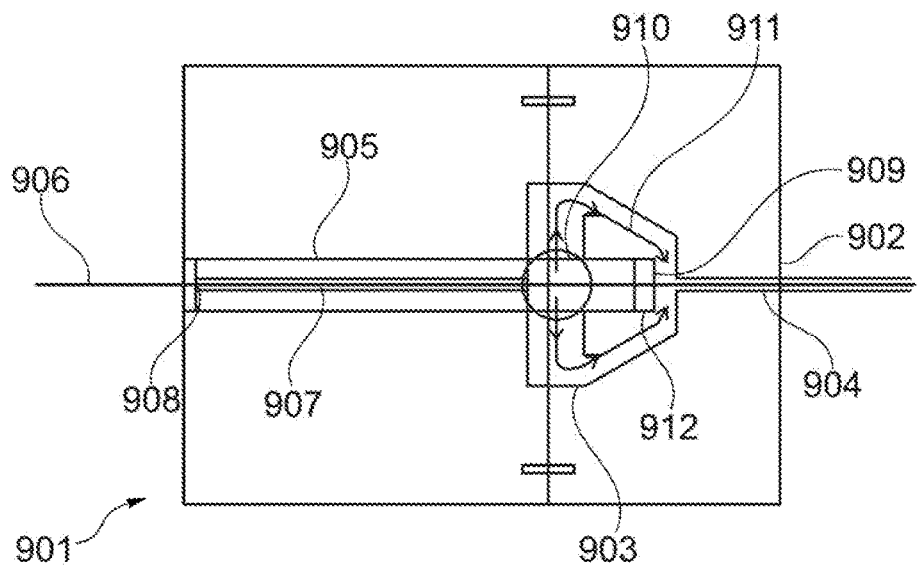
FIGS. 9a and 9b are schematic cut away perspective views of an extrusion part for a system for producing a reinforced flexible structure or seal according to an example embodiment.
Figure 9B:
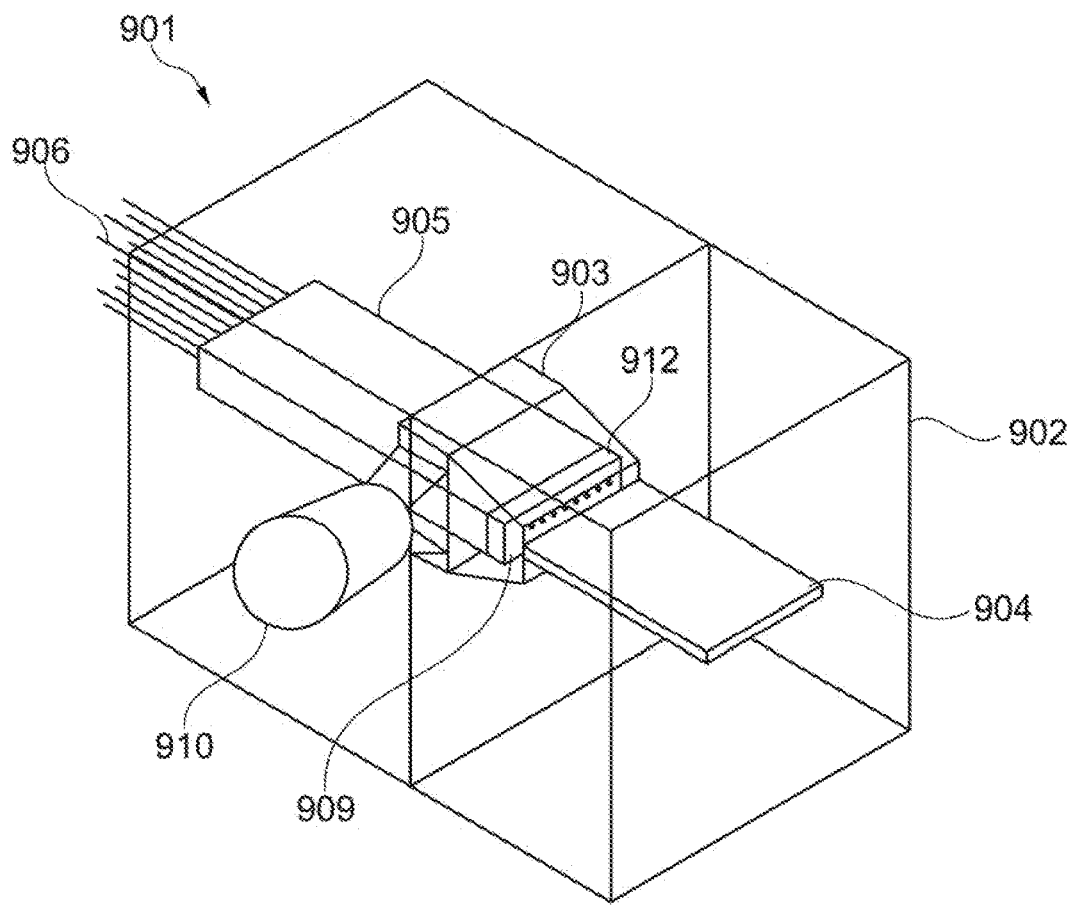

FIGS. 9a, b and 10 illustrate a system 1000 for coating a plurality of metal wires with polymer to produce a reinforced flexible seal of metal wires encompassed by polymer, such as the seals 101, 201 and 301, which reinforced flexible seal or barrier may further be processed as described in connection with FIG. 5 in order to obtain the seal 401a having bulging or wavelike deformations 404a. The seal 401a may be used as a reinforced flexible seal in a sealing assembly or barrier according to embodiments of the present disclosure. FIGS. 9a and 9b are schematic cut away perspective views of an extrusion part 901, which can be used in the system 1000, and FIG. 10 is a schematic view of the system 1000.

The extrusion part 901, which is shown in FIGS. 9a and 9b, has an extrusion die 902 for shaping the structure of polymer and metal wires, where the extrusion die 901 has a die inlet part 903 with an opening and a die outlet part 904 with an opening opposite the die inlet opening. The extrusion part 901 also holds a wire supply part 905 for feeding a plurality of metal wires 906 to the extrusion die 902. The wire supply part 905 comprises a plurality of substantially parallel wire feeding guides 907, where each wire feeding guide 907 is dimensioned for guiding a single wire and has a wire input opening 908 and a wire output opening 909. The wire feeding guides 907 are arranged or positioned with the wire output openings 908 substantially in line and centred at the die inlet part 903 for output of the metal wires 906 into the extrusion die 902.

The extrusion part 901 further comprises one or more inlets 910 for receiving a pressurised molten polymer containing material, and the extrusion part 901 is configured to feed the pressurised molten polymer containing material into the die inlet part 903, whereby the received metal wires 906 and the received molten polymer containing material can be fed through the extrusion die 902 from the die inlet part 903 to the die outlet part 904 to form a structure with the molten polymer containing material encompassing the metal wires 906. The die outlet opening is shaped to give a desired or predetermined shape or form to the resulting structure of molten polymer containing material and metal wires 906.

The wire supply part 905 comprises a wire guide positioning part 912, where the wire guide positioning part 912 holds the wire output openings 909. The wire guide positioning part 912 is arranged or positioned relative to the die inlet part 903 with the wire output openings 909 positioned substantially in line and centred at the die inlet part 903. The wire guide positioning part 912 is received within the die inlet part 903 with a polymer spacing provided between inner wall parts of the die inlet part 903 and outer wall parts of the wire guide positioning part 912. The extrusion part is thus configured for supplying the molten polymer containing material via the polymer inlet 910 into the die inlet part 903 and via the polymer spacing round the wire positioning part 912 to the wire output openings 909 and through the die outlet part 904 as indicated by arrows 911.

In an alternative embodiment, which is not shown in FIGS. 9a and 9b, the wire guide positioning part 912 may have a width and a height, where the width of the wire guide positioning part 912 decreases towards an output end holding the wire output openings 909.

The die inlet opening may have an area being larger the area of the die outlet opening, and for the embodiment of an extrusion part 901 shown in FIGS. 9a and 9b the die inlet part 903 has a width and a height, where the height of the die inlet part 903 decreases inwards from the die inlet opening. The die outlet opening may have a substantially rectangular cross-sectional or elliptical shape to give a flattened shape to the received structure of molten polymer and metal wire, and the die inlet opening may have a substantial rectangular cross-sectional or elliptical shape. It is preferred that die outlet opening has a substantially rectangular cross-sectional shape. It is also preferred that the die inlet opening has a substantial rectangular cross-sectional shape.

The area of the wire input openings 908 of the wire feeding guides 907 may be larger than the area of the wire output openings 909, and the internal cross-sectional area of the wire feeding guides 907 may thus decrease from the wire input openings 908 to the wire output openings 909. In order to securely guide the wires 906, the wire feeding guides 907 should be formed as wire feeding pipes. The wire feeding guides or pipes 907 may have an inner diameter or opening configured to receive metal wires or strips or stainless steel wires with a thickness or diameter of no less than 0.4 mm, such as no less than 0.6 mm, such as no less than 0.8 mm, such as no less than 0.9 mm, such as a diameter of 0.9 mm or 1 mm or 1.1 mm.

It is preferred that each wire feeding guide or pipe 907 has an inner guiding wall, and that the wire feeding guides or pipes 907 have a length which is larger than or equal to the shortest distance between the inner guiding walls of two neighbouring wire feeding guides 907. The length of the wire feeding guides or pipes 907 may be at least two times, such as at least three times, or such as at least four times larger than the distance between the inner walls of two neighbouring wire feeding guides or pipes 907. It is preferred that the wire output opening of each or at least part of the wire feeding guides or pipes 907 has a width or diameter, which is smaller than the shortest distance between the inner guiding walls of two neighbouring wire feeding guides or pipes 907. The shortest distance between the inner guiding walls of two neighbouring wire feeding guides or pipes may be at least one and half times, such as at least two times, such as at least three times larger than the width or diameter of the wire output opening 909.

In order to obtain a flexible seal with metal wires arranged with an equal spacing, at least part or all of the plurality of substantially parallel wire feeding guides or pipes 907 are arranged with a substantial equal spacing. Here, the substantial equal spacing may be equal to or no larger than 20 mm, such as equal to or no larger than 19 mm, such as equal to or no larger than 18 mm, such as equal to or no larger than 17 mm, such as equal to or no larger than 15 mm, such as equal to or no larger than 12 mm, such as equal to or no larger than 10 mm, such as equal to or no larger than 9 mm, such as equal to or no larger than 8 mm, such as no equal to or larger than 7 mm, such as equal to or no larger than 6 mm, such as equal to or no larger than 5 mm, such as equal to or no larger than 4 mm, such as equal to or no larger than 3 mm, or such as equal to or no larger than 2 mm.

Figure 10:
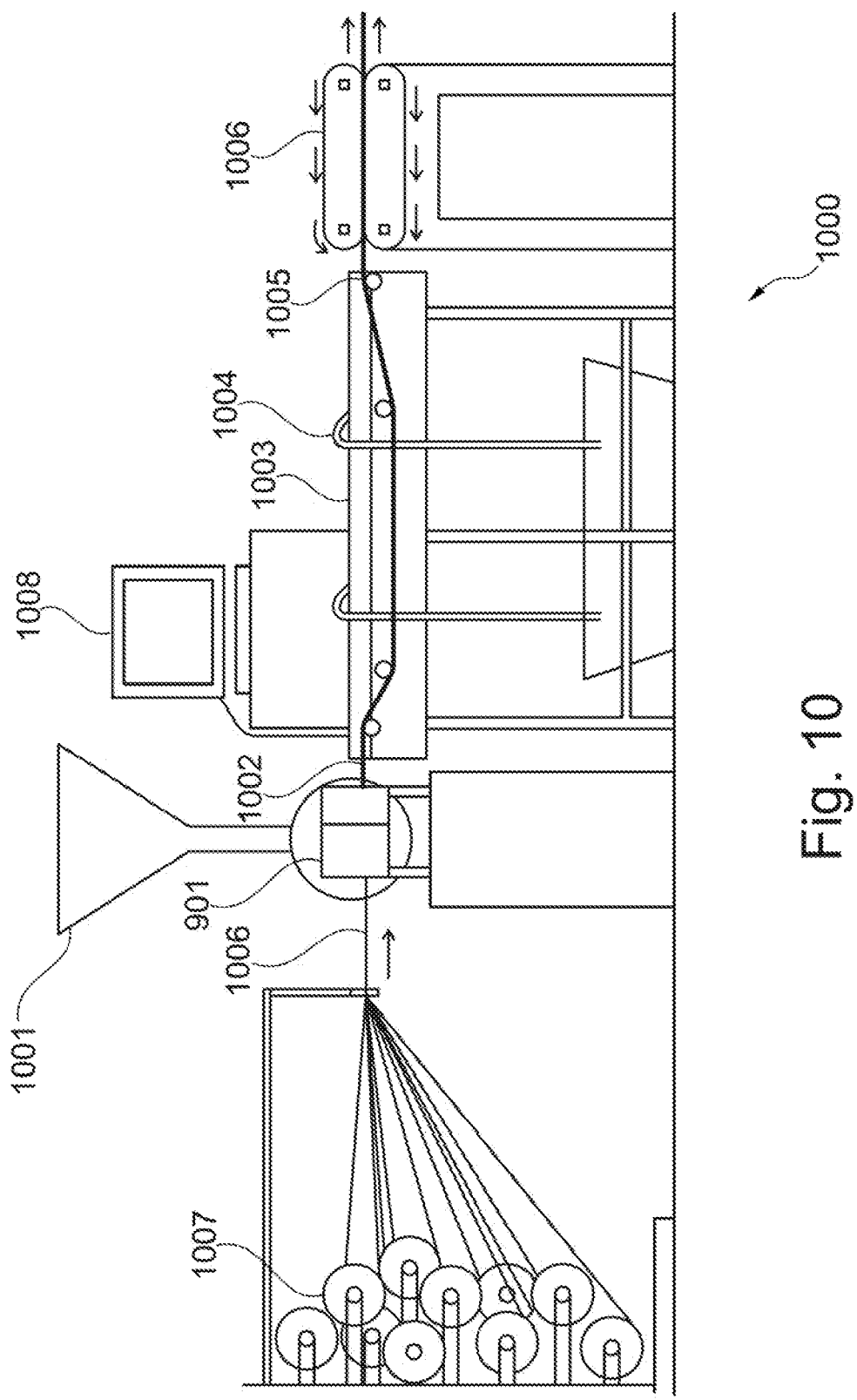
FIG. 10 is a schematic view of a system for producing a reinforced flexible structure or seal according to an example embodiment.

As illustrated in FIG. 10, the system 1000 comprises the extrusion part 901 described above, and a polymer supply 1001 for delivering a molten polymer containing material at a pressure to the extrusion part 901. The system 1000 further comprises a number of wire rolls 1007 holding the metal wires 2603, which are received by the extrusion part 901 via the wire supply part 905. The resulting structure 1002 of molten polymer containing material and metal wires being output from the die output opening of extrusion die 902 is fed into a cooling station 1003, which as shown in FIG. 10 may be an open cask or container holding a cooling medium. The cooling station 1003 holds cooling medium inlets and outlets 1004 for input and output of a cooling medium, such as water, for cooling the received shaped structure 1002 of polymer and metal wires 906. The cooling station 1003 holds one or more supports 1005 for supporting the shaped structure 1002 of polymer and metal wires when being transferred from through the cooling station 1003 while being cooled by the cooling medium. The system 1000 further comprises an extraction unit 1006, which is positioned downstream the cooling station and arranged for receiving and extracting the cooled and shaped structure from an outlet part of the cooling station 1003. The extraction unit 1006 may hold a pair of extraction rolls, which are arranged for receiving the cooled and shaped structure of the polymer containing material and metal wires between the rolls and for extracting the cooled and shaped structure by a rotational movement of the rolls. The system 1000 may also comprise a computer control unit 1008 for controlling the extrusion process performed by use of the system 1000.

Figure 11:
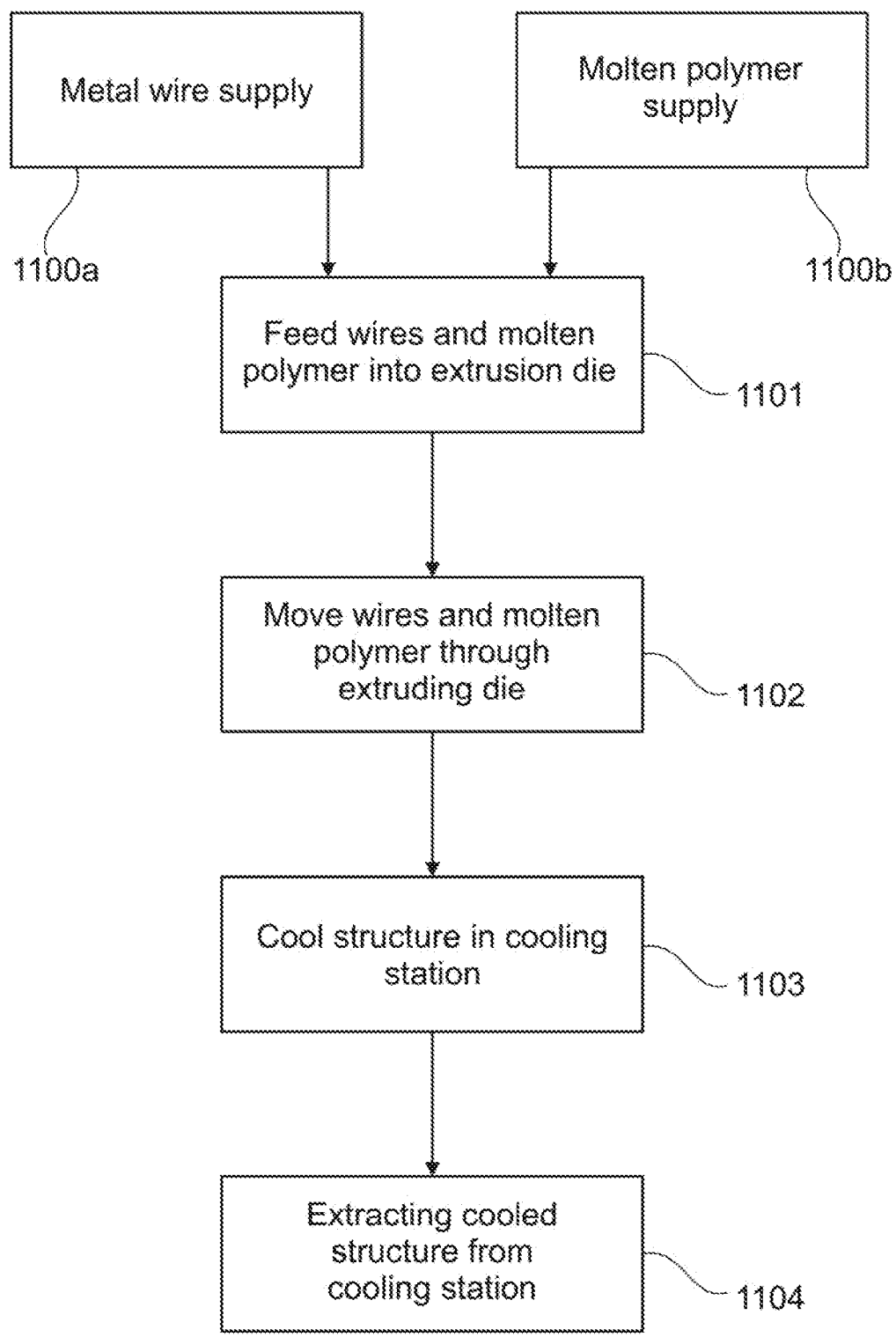
FIG. 11 is a flow chart illustrating a method for producing a reinforced flexible structure or seal according to an example embodiment.

An embodiment of a method for producing a reinforced flexible structure by coating a plurality of metal wires with polymer is illustrated in the flow chart of FIG. 11. In the following, references is made to both FIGS. 9, 10 and 11. The method starts by providing a supply of metal wires 906, step 1100a, and providing a supply of molten polymer, step 1100b. The method then comprises a step 1101 of feeding a plurality of metal wires 906 into an extrusion die 902, with each of said wires running in parallel to each with a substantial equal spacing and in a centred position other within an inlet part 903 of the extrusion die 902, and at the same time feeding the molten polymer at a pressure to the extrusion die 902. It is within an embodiment that the metal wires 906 are pre-heated before being fed into the extrusion die 902. The metal wires 906 may be pre-heated to a temperature in the range of 175 to 225° C., such as about 180° C., or such as about 200° C.

This is followed by step 1102, wherein the molten polymer encompassing the metal wires 906 is passed through the die 902 to shape the molten polymer and metal wires into a flattened structure 1002. Next, step 1103, the obtained flattened structure 1002, which has been passed through the die 902, is cooled to obtain a cooled reinforced flexible structure of metal wires 906 encompassed by polymer. The cooling may be performed in a cooling station 1004. Finally, step 1104, the cooled flattened structure is extracted from the cooling station 1004 by one or more extraction units 1006, such as a pair of extraction rolls 1006.

For the above described systems and methods of FIGS. 9 to 11, it is preferred that the metal wires may be metal wires or narrow metal strips 906 which are made of steel or stainless steel or spring steel. The wires or thin metal strips may have a thickness or diameter equal to or no less than 0.4 mm, equal to or no less than 0.6 mm, equal to or no less than 0.7 mm, equal to or no less than 0.8 mm, equal to or no less than 0.9 mm, equal to or no less than 1 mm, equal to or no less than 1.1 mm, equal to or no less than 1.2 mm, equal to or no less than 1.2 mm, equal to or no less than 1.3 mm, equal to or no less than 1.4 mm, equal to or no less than 1.5 mm, equal to or no less than 1.6 mm, equal to or no less than 1.7 mm, equal to or no less than 1.8 mm, equal to or no less than 1.9 mm, equal to or no less than 2.0 mm, equal to or no less than 2.1 mm, equal to or no less than 2.2 mm, equal to or no less than 2.4 mm, equal to or no less than 2.7 mm, or equal to or no less than 3 mm.

When the wires 906 are formed as metal strips, the metal strips may have a width equal to or no less than 1 mm, equal to or no less than 1.5 mm, equal to or no less than 2 mm, or equal to or no less than 2.5 mm.

The polymer supply 1001 may be configured for delivering the molten polymer to the extrusion part 901 at a temperature in the range of 175 to 225° C., such as about 180° C. The molten polymer may be fed to the extrusion part 901 at a pressure in the range of 20 to 50 bar, such as about 30 bar. The cooling is performed in a cooling station 1004 by a cooling medium, such as cold water, and the flattened structure 1002 is cooled to a temperature in the range of 30 to 45° C., such as about 40° C.

The molten polymer may be polyvinyl chloride, PVC, or the polymer containing material used for the extrusion process may be a thermoplastic elastomer, TPE, type material, such as a thermoplastic vulcanizates, TPV, type material. In an embodiment the polymer containing material is Santoprene™, such as Santoprene 201-73. The flexible structure or seal 1002 being the result of the extrusion processes may have a thickness in the range of 2 to 30 mm, such as in the range of 2 to 20 mm, such as in the range of 2 to 10 mm, such as in the range of 2 to 5 mm, such as in the range of 2.5 to 4 mm, such as about 3 mm.

The wires 906 may be arranged at a distance to each other which is equal to or no larger than 20 mm, such as equal to or no larger than 19 mm, such as equal to or no larger than 18 mm, such as equal to or no larger than 17 mm, such as equal to or no larger than 15 mm, such as equal to or no larger than 12 mm, such as equal to or no larger than 10 mm, such as equal to or no larger than 9 mm, such as equal to or no larger than 8 mm, such as no equal to or larger than 7 mm, such as equal to or no larger than 6 mm, such as equal to or no larger than 5 mm, such as equal to or no larger than 4 mm, such as equal to or no larger than 3 mm, or such as equal to or no larger than 2 mm.

The resulting flexible structure or seal 1002 may have different widths, such as up to 120 cm, such as up to 100 cm, such as up to 80 cm, such as up to 60 cm, such as up to 50 cm, such as up to 40 cm, such as up to 30 cm, or such as up to 20 cm, but when used for sealing or as a barrier, the structure 1002 may have a width in the range of 1.5 to 30 cm, such as in the range of 2 to 20 cm, such as in the range of 2 to 15 cm, such as in the range of 4 to 12 cm, such as in the range of 6 to 10 cm, such as in the range of 7 to 9 cm, such as about 8 cm.

The invention has been described in conjunction with various embodiments herein. However, other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality.

The invention claimed is:

1. A reinforced flexible seal for sealing a gap or space between an edge of a wall, fence, door, door leaf or wing, port or window and a surface adjacent to the wall, fence, door, door leaf or wing, port or window, said reinforced flexible seal having a width and a length and comprising:
    a flexible outer material; and
    a plurality of elongated metal wires embedded in the flexible outer material,
    wherein all of said plurality of metal wires are running substantially in parallel to each other within the flexible outer material in a longitudinal direction of the reinforced flexible seal with at least part of said elongated metal wires arranged at a distance to each other;
    wherein several of said parallel running metal wires holds several bulging or wavelike deformations in the longitudinal direction of the wire; and
    wherein for at least two parallel running metal wires, the bulging or wavelike deformations of one wire are positioned parallel to the bulging or wavelike deformations of a neighboring parallel wire.

2. A reinforced flexible seal according to claim 1, wherein each metal wire holding bulging or wavelike deformations has a diameter or thickness, and the bulging or wavelike deformations have a top part and a bottom or lower part with a height difference between the highest point of the top part and the lowest point of the bottom or lower part; said difference in height between the top part and a consecutive bottom part of a bulging or wavelike deformation being at least ½ of said diameter or thickness.

3. A reinforced flexible seal according to claim 2, wherein said difference in height between the top part and a consecutive bottom part of a bulging or wavelike deformation is no larger than 5 times said diameter or thickness.

4. A reinforced flexible seal according to claim 1, wherein each metal wire holding bulging or wavelike deformations has a diameter or thickness, and wherein the distance between two closest arranged consecutive tops of said bulging or wavelike deformations is no larger than 20 times said diameter or thickness.

5. A reinforced flexible seal according to claim 4, wherein the distance between two closest arranged consecutive tops of said bulging or wavelike deformations is at least 5 times said diameter or thickness.

6. A reinforced flexible seal according to claim 1, wherein the flexible outer material has a thickness in the range of 2 to 5 times the diameter or thickness of a metal wire holding bulging or wavelike deformations.

7. A reinforced flexible seal according to claim 1, wherein for several or all of the plurality of elongated metal wires, at least part of said metal wires holds several bulging or wavelike deformations in the longitudinal direction.

8. A reinforced flexible seal according to claim 1, wherein said several bulging or wavelike deformations are arranged consecutively in the longitudinal direction.

9. A reinforced flexible seal according to claim 1, wherein said bulging or wavelike deformations extend substantially perpendicular to a plane defined by the lengthwise and widthwise directions of the reinforced flexible seal.

10. A reinforced flexible seal according to claim 9, wherein the flexible outer material, in which the at least one metal wire holding bulging or wavelike deformations is embedded, is deformed in accordance with the deformation of said metal wire(s).

11. A reinforced flexible seal according to claim 1, wherein for at least part of or all of said plurality of elongated metal wires embedded in the flexible outer material, the distance between two neighbouring wires does not exceed a predetermined maximum distance.

12. A reinforced flexible seal according to claim 11, wherein the reinforced flexible seal has a lower or outer edge, and the spacing between said lower or outer edge and a lower- or outermost positioned elongated metal wire is smaller than said predetermined maximum distance.

13. A reinforced flexible seal according to claim 1, wherein said bulging or wavelike deformations in the longitudinal direction of a wire are similarly shaped or deformed.

14. A reinforced flexible seal according to claim 1, wherein said bulging or wavelike deformations in the longitudinal direction of a wire are arranged with substantially equal spacing.

15. A reinforced flexible seal according to claim 1, wherein said several bulging or wavelike deformations in the longitudinal direction comprises at least 2 consecutive bulging or wavelike deformations.

16. A reinforced flexible seal according to claim 1, wherein the flexible outer material has a substantially constant thickness.

17. A reinforced flexible seal according to claim 1, wherein only elongated metal wires are embedded in the flexible outer material of the reinforced flexible seal.

18. A reinforced flexible seal according to claim 1, wherein all the elongated metal wires of the reinforced flexible seal are arranged substantially parallel to each other, and successively arranged elongated metal wires are arranged with substantially equal spacing.

19. A reinforced flexible seal according to claim 1, wherein at least part of or all the elongated metal wires extend in the whole length of the flexible seal.

20. A reinforced flexible seal according to claim 1, wherein the flexible outer material comprises a flexible plastic material or a rubber material.

21. A reinforced flexible seal according to claim 1, wherein the flexible outer material comprises a thermoplastic elastomer.

22. A reinforced flexible seal according to claim 1, at least part of or all of said metal wires are arranged at a distance to each other being no larger than 8 mm.

23. A reinforced flexible seal according to claim 1, wherein the metal wires are made of one or more of iron, steel, and stainless steel and alloys thereof.

24. A reinforced flexible seal according to claim 1, wherein the reinforced the flexible seal has an upper part and a bottom part, and wherein
   a brush or fibre material is attached to or integrated into the bottom part of the reinforced flexible seal and extends below said reinforced flexible seal.

25. A reinforced flexible seal according to claim 24, wherein the brush or fibre material further extends in the lengthwise direction of the flexible structure.

26. A sealed wall, fence, door, port or window assembly comprising:
   a wall, fence, door, door leaf or wing, port or window with a lower or outer edge, and
   a reinforced flexible seal or seal assembly according to claim 1, wherein the reinforced flexible seal is connected to the lower or outer edge of the wall, fence, door, door leaf or wing, port or window.

27. A sealed wall, fence, door, port or window assembly according to claim 26, wherein an upper or connection part of the reinforced flexible seal is connected to the lower or outer edge of the wall, fence, door, door leaf or wing, port or window, and a lower or sealing part of the reinforced flexible seal extends below said lower edge or further out from said outer edge, wherein said lower or sealing part of the seal comprises several of said embedded metal wires running in the longitudinal direction of the seal and holding said bulging or wavelike deformations.

28. A sealed wall, fence, door, port or window assembly according to claim 27, wherein the elongated metal wires of the lower or sealing part of the flexible seal extend substantially parallel to the longitudinal direction of said lower or outer edge.

29. A sealed wall, fence, door, port or window assembly according to claim 27, wherein the upper or connection part of the reinforced flexible seal has no embedded metal wires, or only a part of the upper or connection part of the reinforced flexible seal has embedded metal wires.

30. A sealed wall, fence, door, port or window assembly according to claim 26, wherein the reinforced flexible seal comprises a mounting or connection part and a sealing part,
   wherein the sealing part comprises several of said metal wires embedded in the flexible outer material and running in the longitudinal direction of the seal and holding bulging or wavelike deformations, and
   wherein at least part of the mounting or connection part is connected to the wall, fence, door, door leaf or wing, port or window edge and at least part of the sealing part is positioned free from the wall, fence, door, door leaf or wing, port or window edge.

31. A sealed wall, fence, door, port or window assembly for sealing a space between an edge of a wall, fence, door, port or window and an adjacent surface to avoid entrance of animals, insects, or water between the edge of the door or window and the surface, or to avoid temperature changes across the sealed space, said door or window assembly comprising:
   a wall, fence, door, door leaf or wing, port or window with an outer edge, and
   a reinforced flexible seal or seal assembly according to claim 1, wherein the reinforced flexible seal is connected to the outer edge of the wall, fence, door, door leaf or wing, port or window.

* * * * *